US012026838B2

(12) United States Patent
Serizawa et al.

(10) Patent No.: US 12,026,838 B2
(45) Date of Patent: Jul. 2, 2024

(54) DISPLAY SYSTEM AND SERVER

(71) Applicant: TOYOTA JIDOSHA KABUSHIKI KAISHA, Toyota (JP)

(72) Inventors: Kazumi Serizawa, Toyota (JP); Kazuki Komoriya, Toyota (JP); Sayaka Ishikawa, Miyoshi (JP); Shunsuke Tanimori, Nagoya (JP); Masaya Miura, Toyota (JP); Kouji Tamura, Tokyo (JP); Seiei Hibino, Nagakute (JP); Rina Mukai, Toyota (JP); Tomoya Inagaki, Miyoshi (JP); Chinli Di, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 330 days.

(21) Appl. No.: 17/552,658

(22) Filed: Dec. 16, 2021

(65) Prior Publication Data
US 2022/0198760 A1    Jun. 23, 2022

(30) Foreign Application Priority Data
Dec. 21, 2020    (JP) .................. 2020-211009

(51) Int. Cl.
*A63F 13/65* (2014.01)
*A63F 13/428* (2014.01)
(Continued)

(52) U.S. Cl.
CPC .......... *G06T 19/006* (2013.01); *A63F 13/428* (2014.09); *A63F 13/65* (2014.09);
(Continued)

(58) Field of Classification Search
CPC .. A63F 13/211; A63F 13/2145; A63F 13/216; A63F 13/26; A63F 13/327; A63F 13/33; A63F 13/332; A63F 13/335; A63F 13/40; A63F 13/42; A63F 13/426; A63F 13/42845; A63F 13/46; A63F 13/50; A63F 13/52; A63F 13/55
See application file for complete search history.

(56) References Cited

U.S. PATENT DOCUMENTS

2019/0217202 A1* 7/2019 Komori .................. A63F 13/65
2019/0329136 A1* 10/2019 Koyama ................ A63F 13/55
(Continued)

FOREIGN PATENT DOCUMENTS

JP    2019-075125 A    5/2019
JP    2019-139425 A    8/2019

*Primary Examiner* — Omkar A Deodhar
(74) *Attorney, Agent, or Firm* — Sughrue Mion, PLLC

(57) ABSTRACT

A display system includes a display device and a remote terminal device. The display device includes an image shooting device, an image recognizer, and a display controller. The image recognizer recognizes real objects in an image shot by the image shooting device, and recognizes positions of the recognized real objects on space coordinates. The display controller superimposes a virtual object at a designated position on the space coordinates in the shot image. The image recognizer recognizes a gesture of the real object at the designated position of the virtual object in the shot image. The display controller executes image processing on the virtual object in response to the recognized gesture.

4 Claims, 20 Drawing Sheets

(51) Int. Cl.
*G06F 3/01* (2006.01)
*G06T 7/70* (2017.01)
*G06T 19/00* (2011.01)
*G06V 10/70* (2022.01)

(52) U.S. Cl.
CPC ............... *G06F 3/017* (2013.01); *G06T 7/70* (2017.01); *G06V 10/70* (2022.01); *A63F 2300/69* (2013.01)

(56) References Cited

U.S. PATENT DOCUMENTS

2020/0368616 A1* 11/2020 Delamont ............ H04N 13/239
2020/0368625 A1* 11/2020 Iwata ...................... A63F 13/53
2021/0146265 A1* 5/2021 Lamm ................. G06F 3/04815

* cited by examiner

DISPLAY SYSTEM AND SERVER

CROSS-REFERENCE TO RELATED APPLICATION

This application claims priority to Japanese Patent Application No. 2020-211009 filed on Dec. 21, 2020, incorporated herein by reference in its entirety.

BACKGROUND

1. Technical Field

Disclosed herein are a display system configured to display an augmented reality (AR) image, and a server in the display system.

2. Description of Related Art

Hitherto, there is known a display device using an augmented reality technology. For example, in Japanese Unexamined Patent Application Publication No. 2019-075125 (JP 2019-075125 A), image processing is executed on a virtual object by making a gesture on the virtual object. For example, a folder icon (storage icon) is projected as the virtual object on a head-mounted display (HMD). For example, image processing for opening the folder icon is executed by making a gesture such as pinching of the three-dimensional (3D) icon with fingers.

SUMMARY

A service of a so-called AR game such as a game of chasing and capturing a fleeing virtual object may be provided by using the augmented reality technology. If the fleeing route of the fleer virtual object is provided in the same pattern, it is difficult to keep the attractiveness of the game. If an algorithm is created to complicate the fleeing route, a system that provides the AR game may have an excessive load.

Disclosed herein are a display system and a server in the display system, in which the attractiveness of a provided AR game can be kept while reducing a load on a system that provides the game.

A display system is disclosed herein. The display system includes a display device and a manipulation device. The display device includes an image shooting device, an image recognizer, and a display controller. The image shooting device is configured to shoot a scene in a real world. The image recognizer is configured to recognize real objects in an image shot by the image shooting device, and recognize positions of the recognized real objects on space coordinates. The display controller is configured to superimpose a virtual object at a designated position on the space coordinates in the shot image. The image recognizer is configured to recognize a gesture of the real object at the designated position of the virtual object in the shot image. The display controller is configured to execute image processing on the virtual object in response to the recognized gesture. The manipulation device includes an inputter configured to input a manipulation command to change the designated position of the virtual object.

According to the configuration described above, the virtual object serving as, for example, a chasing target in an AR game is manipulated by a manipulator who inputs the manipulation command to the manipulation device. Thus, it is possible to avoid, without creating a complicated algorithm, a case where the fleeing route of the virtual object is provided in the same pattern.

In the configuration described above, the display system may further include a server communicable with the display device and the manipulation device. In this case, the display device may be arranged in a complex facility including a plurality of facilities with different specific themes. The server may include a storage and a transmitter. The storage may be configured to store character images set as characters in the individual facilities in association with pieces of positional information in the complex facility. The transmitter may be configured to transmit data on the character images to the display device together with the pieces of positional information associated with the character images. The display controller may be configured to select, as an image of the virtual object, the character image associated with the designated position, and superimpose the character image on the shot image.

According to the configuration described above, the character image harmonized with a world of the facility such as a theme park can be displayed as the image of the virtual object.

In the configuration described above, the gesture may be a capturing action at the designated position. In this case, the display device may be configured to transmit a capture notification to the server when the image recognizer recognizes the capturing action performed by the real object. The server may include a reward calculator configured to determine a reward for a manipulator of the manipulation device based on a fleeing period from a start timing of manipulation of the virtual object to a timing of recognition of the capturing action.

According to the configuration described above, the reward is given to the manipulator of the virtual object as a motivation to manipulate the virtual object while spending time.

In the configuration described above, the display device may include an inputter configured to input participation registration as a chaser in a chasing game for chasing the virtual object. In this case, the manipulation device may include an inputter configured to input participation registration in the chasing game as a manipulator of the virtual object. The server may include a participant calculator configured to calculate the numbers of the chasers and the manipulators participating in the chasing game, and acquire positions in the complex facility about the virtual object manipulated by the manipulator and the display device of the chaser. The reward calculator may be configured to determine the reward for the manipulator based on a virtual object space density around the captured virtual object at the timing of recognition of the capturing action.

According to the configuration described above, different rewards can be given, for example, between a state in which the virtual object space density is high, that is, the capture is difficult and a state in which the virtual object space density is low, that is, the capture is easy.

In the configuration described above, the reward calculator may be configured to determine the reward for the manipulator of the manipulation device based on a chaser space density around the captured virtual object at the timing of recognition of the capturing action.

According to the configuration described above, different rewards can be given between a state in which the chaser space density is high, that is, the capture is easy and a state in which the chaser space density is low, that is, the capture is difficult.

A server is disclosed herein. The server is communicable with display devices and manipulation devices. Each display device is configured to display a virtual object in a shot image obtained by shooting a scene in a real world, and execute a chasing game for chasing the virtual object. Each manipulation device includes an inputter configured to input a manipulation command for the virtual object. The server includes a storage and a transmitter. The storage is configured to store pieces of positional information of the display devices participating in the chasing game, and pieces of positional information of the virtual objects manipulated by the manipulation devices. The transmitter is configured to transmit, to a predetermined display device among the display devices, the positional information of the virtual object around the display device based on the positional information of the display device.

According to the display system and the server disclosed herein, the attractiveness of the AR game can be kept while reducing the load on the system that provides the AR game.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
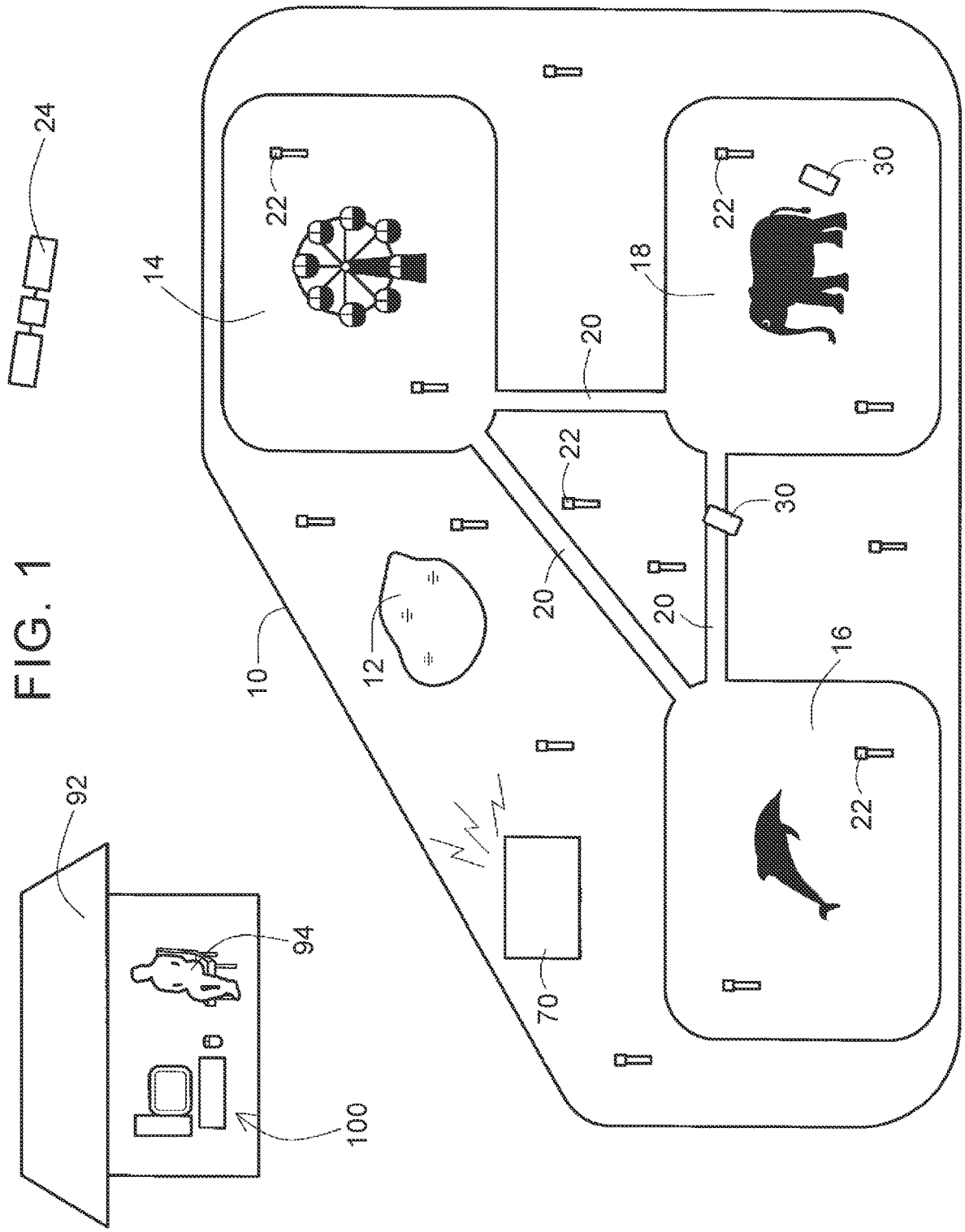
FIG. 1 is a diagram exemplifying an entertainment complex and a house at a remote place using a display system according to an embodiment.

FIG. 1 exemplifies an entertainment complex 10 and a house 92 using a display system according to an embodiment. The house 92 is located at a place remote from the entertainment complex 10, and a manipulator 94 who uses the display system is in the house 92. The display system includes a display device 30 and a server 70 provided in the entertainment complex 10, and a remote terminal device 100 (manipulation device) provided in the house 92.

Configuration of Entertainment Complex

The entertainment complex 10 includes a plurality of theme parks 14, 16, and 18. The theme park is a field where a world is created based on a specific theme (subject) and facilities, events, and scenery are elaborated integrally based on the world. For example, the theme parks 14, 16, and 18 are connected by access roads 20, and visitors to the entertainment complex 10 can move around the theme parks 14, 16, and 18 via the access roads 20.

The entertainment complex 10 includes theme parks having different themes. For example, the entertainment complex 10 includes an amusement park 14, an aquarium 16, and a zoo 18 as the theme parks.

Characters are set based on the themes of the individual theme parks 14, 16, and 18. The characters are set in harmony with the themes and worlds of the theme parks 14, 16, and 18. Examples of characters in the amusement park 14 include a clown and a go-kart. Examples of characters in the aquarium 16 include a fish and a shark. Examples of characters in the zoo 18 include a monkey, a lion, and a panda.

As described later, images of those characters (hereinafter referred to as "character images" as appropriate) are used as images of fleers in a chasing game that is an AR game service available in the entertainment complex 10.

The chasing game can be played by visitors to the entertainment complex 10, and is typified by "tag" using an augmented reality technology. In the chasing game, a virtual image of a fleer serving as a chasing target is superimposed on a shot image showing the inside of the entertainment complex 10 and the superimposed image (AR image) is displayed on the display device 30 as described later. A visitor acting as a chaser chases the virtual image to capture the virtual image. In the display system according to this embodiment, the virtual image of the fleer is manipulated by using the remote terminal device 100 remote from the entertainment complex 10.

The visitors can move not only in the theme parks 14, 16, and 18 and along the access roads 20 but also in any area inside the entertainment complex 10. For example, areas outside the access roads 20 are grasslands where the visitors can stroll. In the chasing game, a chaseable area (chasing field) is set to, for example, the entire area in the entertainment complex 10. In the chasing game, the area in the entertainment complex 10 is virtually divided into a plurality of areas as exemplified in FIG. 2. For example, the area is divided into three areas that are an amusement park area 14A including the amusement park 14, an aquarium area 16A including the aquarium 16, and a zoo area 18A including the zoo 18. Borders among the areas are virtual, and no physical borders such as a fence are provided. The visitors to the entertainment complex 10 can freely move to the individual areas.

In the chasing game, images of virtual objects (character images) to be displayed in the areas 14A to 18A are set different from each other. For example, a character image set for the amusement park 14 is displayed as a virtual object image in the amusement park area 14A. Similarly, a character image set for the aquarium 16 is displayed as a virtual object image in the aquarium area 16A. A character image set for the zoo 18 is displayed as a virtual object image in the zoo area 18A.

Pieces of data on the character images (character image data) in the theme parks 14, 16, and 18 are stored in a theme park-specific character storage 82 of the server 70 (see FIG. 4) in association with identification symbols and pieces of positional information of the theme parks 14, 16, and 18. For example, the server 70 is installed in a manager building (not illustrated) in the entertainment complex 10. Details of the character image data stored in the theme park-specific character storage 82 are described later.

Referring back to FIG. 1, the entertainment complex 10 includes beacon transmitters 22. For example, a plurality of transmitters 22 is provided at regular intervals. As described later, a beacon receiver 37 of the display device 30 (see FIG. 3) receives a signal from any transmitter 22 to acquire a current position of the display device 30.

The remote terminal device 100 is arranged in the house 92 at the place remote from the entertainment complex 10. As described later in detail, a fleer virtual object (character) in the chasing game serving as the AR game in the display system according to this embodiment is manipulated by using the remote terminal device 100. That is, a visitor to the entertainment complex 10 participates in the chasing game as a chaser, and the virtual object serving as a chasing target is manipulated such that the manipulator 94 remote from the entertainment complex 10 inputs a manipulation command to the remote terminal device 100.

Configurations of Devices in Display System

Figure 3:
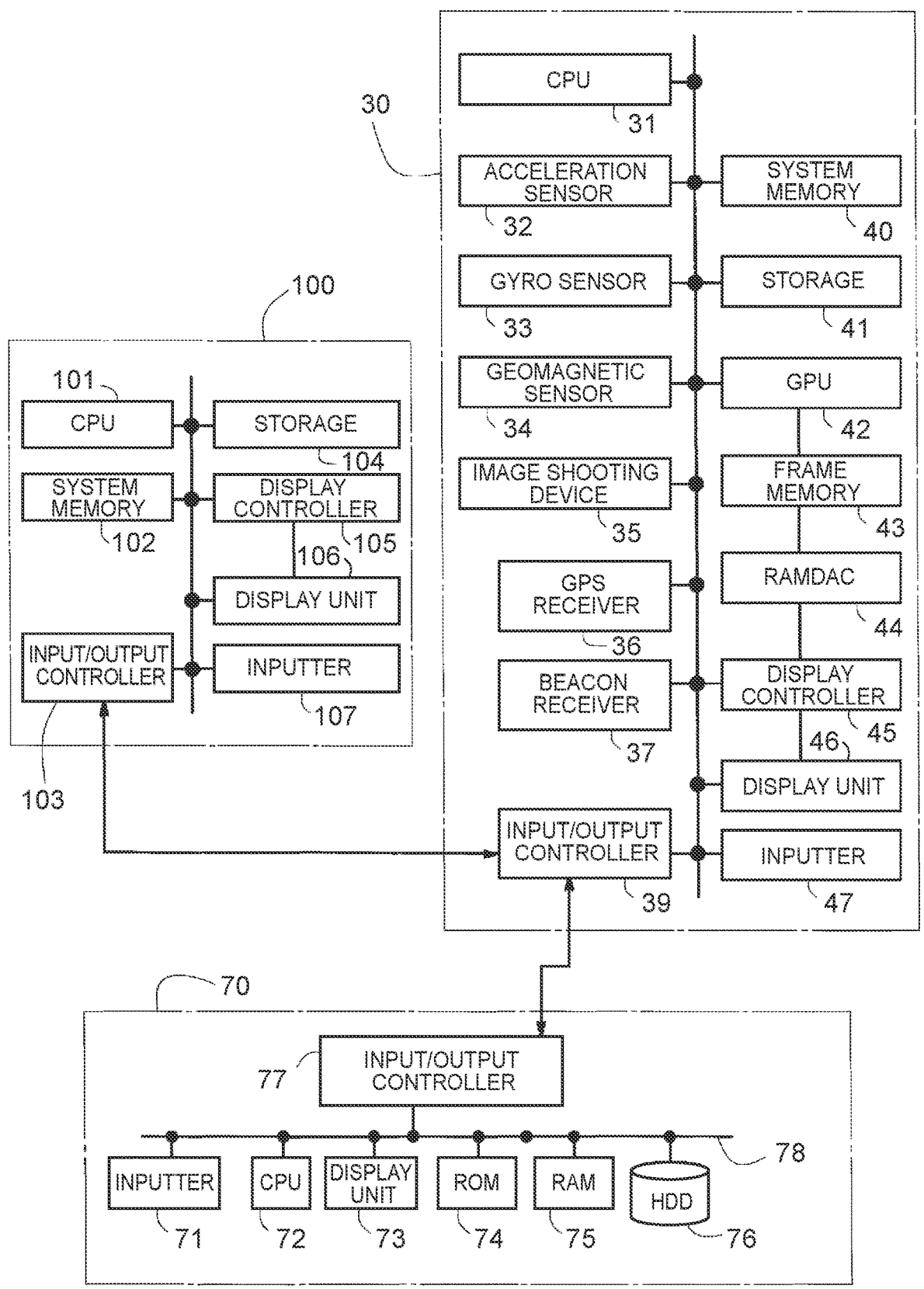
FIG. 3 is a diagram exemplifying the hardware configurations of devices in the display system according to the embodiment.

FIG. 3 exemplifies the hardware configurations of devices in the display system according to this embodiment. The display system according to this embodiment includes the display device 30, the server 70, and the remote terminal device 100.

Configuration of Server

Referring to FIG. 3, the server 70 is, for example, a computer and installed in the management building in the entertainment complex 10 (see FIG. 1). The server 70 is wirelessly connected to the display device 30 by a communication method such as a wireless local area network (LAN). The server 70 is communicable with the remote terminal device 100 by a communication method such as the Internet.

The server 70 includes an inputter 71 including a keyboard and a mouse, a central processing unit (CPU) 72 serving as a processor, and a display unit 73 such as a display. The server 70 includes a read-only memory (ROM) 74, a random-access memory (RAM) 75, and a hard disk drive (HDD) 76 as storages. The server 70 includes an input/output controller 77 configured to manage input and output of information. Those components are connected to an internal bus 78.

Figure 4:
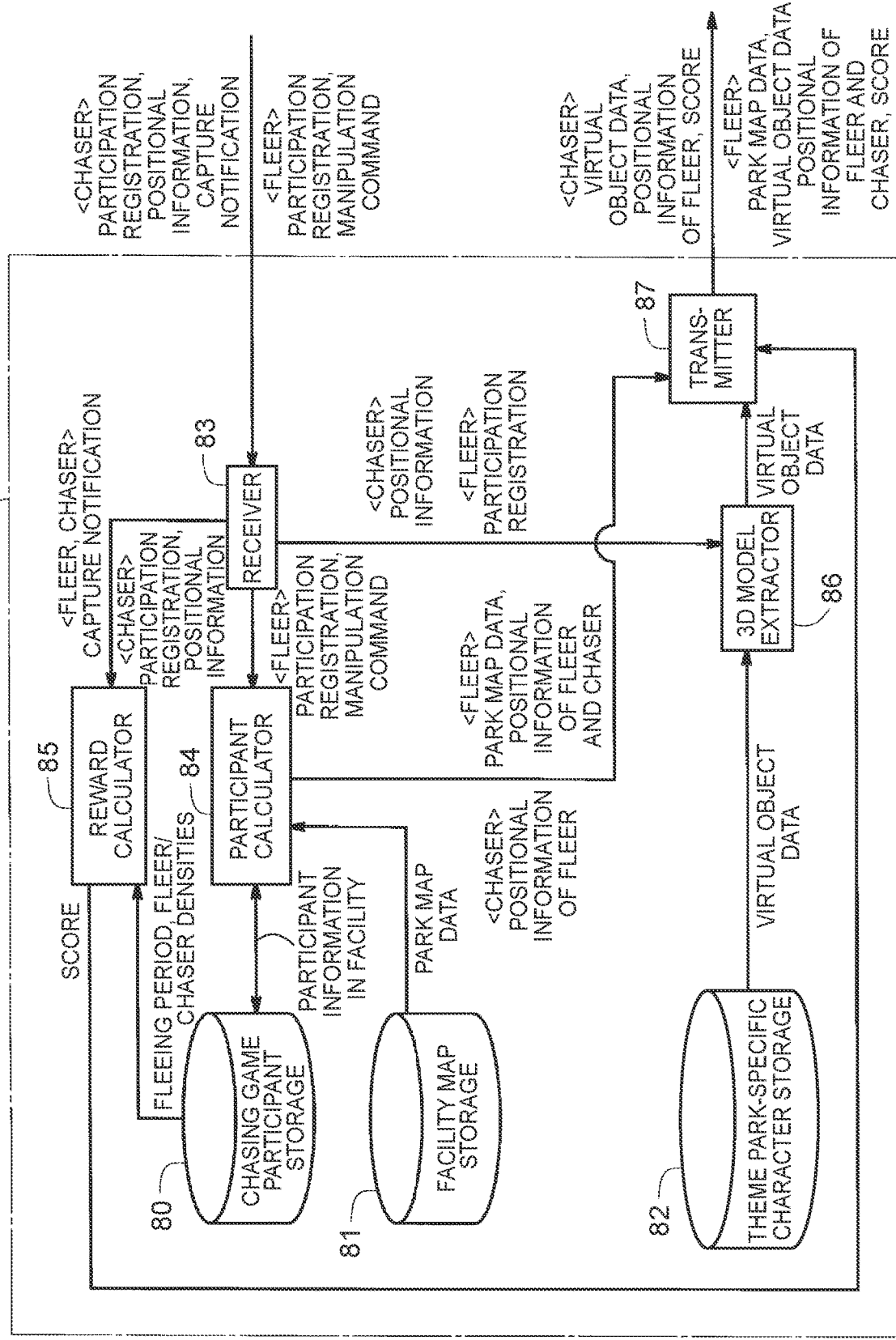
FIG. 4 is a diagram exemplifying functional blocks of a server according to the embodiment.

FIG. 4 exemplifies functional blocks of the server 70. For example, the functional blocks are implemented such that the CPU 72 executes programs stored in the ROM 74, the HDD 76, or a non-transitory computer-readable storage medium such as a digital versatile disc (DVD).

The server 70 includes a receiver 83, a participant calculator 84, a reward calculator 85, a 3D model extractor 86, and a transmitter 87 as functional units. The server 70 includes a chasing game participant storage 80, a facility map storage 81, and the theme park-specific character storage 82 as storages.

The chasing game participant storage 80 stores participant information in the chasing game serving as the AR game. Participants include chasers and fleers. The chasers include any visitor to the entertainment complex 10 who has sent a request for participation registration as a chaser in the chasing game from the display device 30 of the visitor. The fleers include a person who has sent a request for participation registration as a fleer in the chasing game from the remote terminal device 100.

The chasing game participant storage 80 stores pieces of information on a chaser and a fleer participating in the chasing game. For example, chaser information includes an identification symbol and positional information of the display device 30 of the chaser. Fleer information includes an identification symbol of the remote terminal device 100 manipulated by the manipulator 94 (see FIG. 1), and positional information of a virtual object manipulated by using the remote terminal device 100.

The facility map storage 81 stores park map data that is map information in the entertainment complex 10. For example, pieces of positional information of the access roads 20 and the facilities in the entertainment complex 10 are stored as the park map data. Further, positional information of a no-entry area such as a pond 12 (see FIG. 1) is stored. For example, the no-entry area is set as a fleer's movement prohibition area.

Specifically, the facility map storage 81 stores map data of the entertainment complex 10 as the park map data in association with positional information. The positional information is positional information in a so-called world coordinate system. The positional information in the world coordinate system includes information on a latitude, a longitude, and an altitude acquirable by using a global positioning system (GPS) function, and space coordinate information acquirable by using a beacon function.

Figure 2:
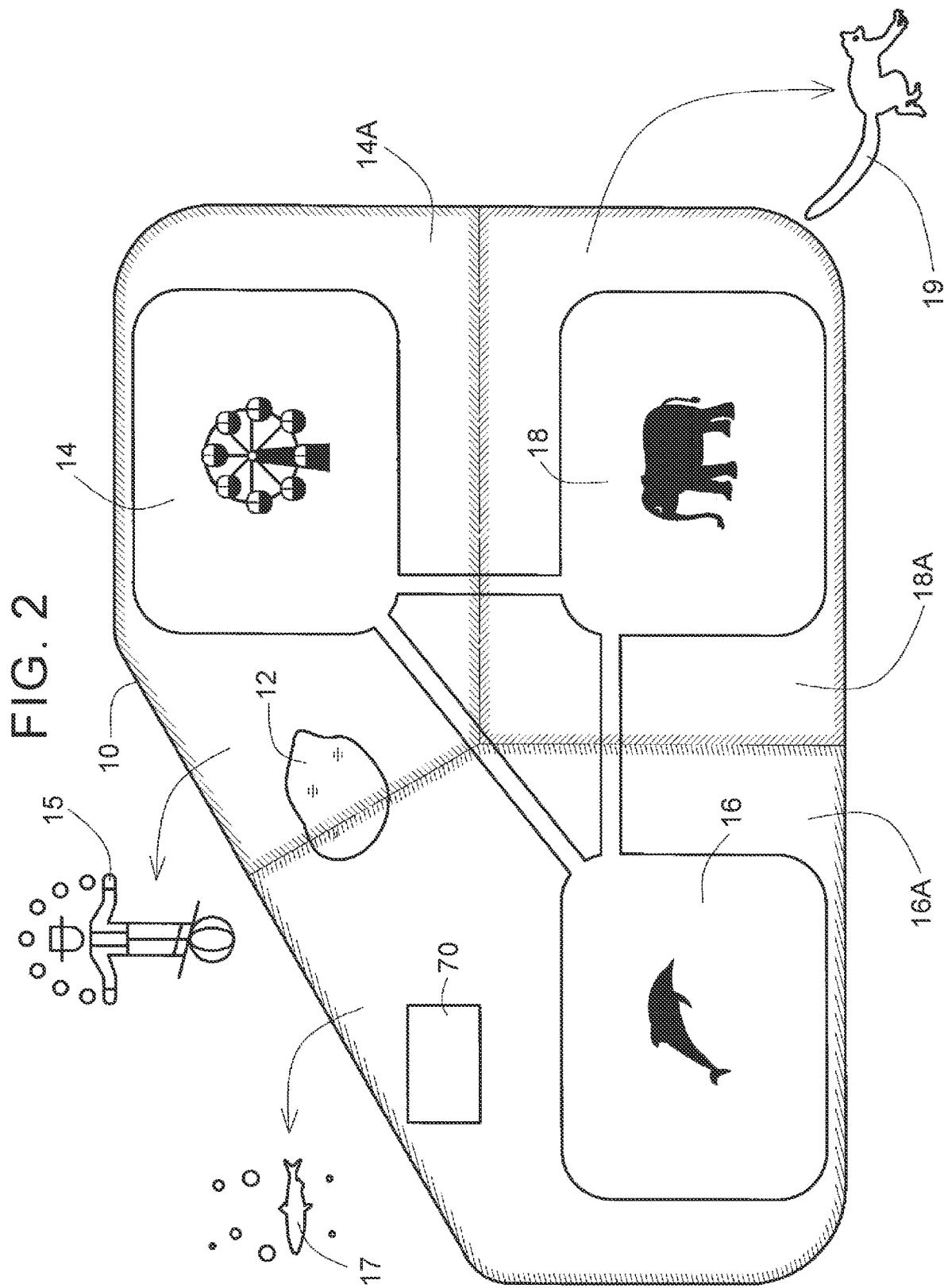
FIG. 2 is a diagram for describing character display areas in the entertainment complex.

The facility map storage 81 stores pieces of data on the areas 14A, 16A, and 18A in the chasing game in FIG. 2. For example, border lines of the areas 14A, 16A, and 18A are set in the park map data, and identification symbols of the areas 14A, 16A, and 18A are assigned to areas defined by the border lines.

The theme park-specific character storage 82 stores pieces of data on character images that are fleer images to be displayed as virtual object images on the display device 30. The characters are set as the characters in the theme parks 14, 16, and 18 in harmony with their worlds. For example, a plurality of types of character image data is stored in the theme park-specific character storage 82 for each of the theme parks 14, 16, and 18. For example, 10 types or more and 100 types or less are stored in the theme park-specific character storage 82 as the character image data of one theme park. The pieces of character image data have identification symbols for each of the theme parks 14, 16, and 18, that is, the areas 14A, 16A, and 18A. Each piece of character image data has a unique identification symbol.

The character image data serving as the virtual object is stored in the theme park-specific character storage 82 together with positional information associated with the data. The positional information associated with the character image data includes information on an area in the entertainment complex 10 where display of the image data is permitted. The character image data and the associated positional information data are hereinafter referred to collectively as "virtual object data" as appropriate.

As exemplified in FIG. 2, character images 15 whose identification symbols are associated with the amusement park 14 and whose display areas are set to the amusement park area 14A include an image of a clown balancing on a ball. Character images 17 whose identification symbols are associated with the aquarium 16 and whose display areas are set to the aquarium area 16A include an image of a swimming fish. Similarly, character images 19 whose identification symbols are associated with the zoo 18 and whose display areas are set to the zoo area 18A include an image of a running monkey.

The character image data may be 3D model data. For example, the 3D model data includes 3D image data of the character. The image data includes shape data, texture data, and motion data. The image data also includes data on an effect image to be displayed when the virtual object is captured.

For clarity, FIG. 2 illustrates outlines of the character images 15, 17, and 19. The character images 15, 17, and 19 are not limited to the outlines, and 3D images may be displayed as the character images 15, 17, and 19.

For example, the participant calculator 84 calculates the number of participants in the chasing game. The participants include a chaser and a fleer. The participant calculator 84 acquires positional information in the entertainment complex 10 about the chaser participating in the chasing game, more specifically, the display device 30 of the chaser. The participant calculator 84 acquires positional information in the entertainment complex 10 about the fleer (virtual object) manipulated by a manipulator participating in the chasing game. For example, the participant calculator 84 calculates a chaser space density and a fleer space density (virtual object space density) described later by referring to the chasing game participant storage 80.

Based on positional information of the display device 30 participating in the chasing game (as a chaser), the participant calculator 84 provides positional information of a virtual object (fleer) around the position to the display device 30. The participant calculator 84 provides the park map data and the pieces of positional information of the fleer and the chaser to the remote terminal device 100 participating in the chasing game (as the fleer).

The 3D model extractor 86 extracts character image data of a virtual object from the theme park-specific character storage 82. The extracted image data is transmitted to the display device 30 and the remote terminal device 100 via the transmitter 87.

The 3D model extractor 86 may transmit pieces of character image data in all the areas 14A, 16A, and 18A to the display device 30 and the remote terminal device 100. For example, one arbitrary type of character image data in each of the areas 14A, 16A, and 18A is transmitted to the display device 30 and the remote terminal device 100.

The reward calculator 85 calculates a reward to be given to a manipulator who has manipulated a fleer in the chasing game. For example, the reward is calculated based on a fleeing period. Other elements for the reward calculation include a fleer space density and a chaser space density on the periphery when the fleer is captured. Examples of the reward include a discount service for an admission fee of the entertainment complex 10. The reward calculation is described later.

Configuration of Display Device 30

Referring to FIG. 1, the display device 30 is provided in the entertainment complex 10, and is used by a visitor (user) to the entertainment complex 10. The display device 30 can display a virtual reality image by superimposing an image of a virtual object on a scene in the real world.

The display device 30 may be a mobile device. Examples of the display device 30 include a smartphone including an image shooting device and a display unit, and a head-mounted display (HMD) in the form of glasses.

In view of methods for displaying scenes in the real world, the display device 30 may be categorized into a video see-through display (VST display) and an optical see-through display (OST display). In the VST display, an image shooting device such as a camera shoots a scene in the real world, and a display unit displays the shot image. In the OST display, a scene in the real world is viewed through a transmissive display unit such as a half-silvered mirror, and a virtual object is projected on the display unit.

The display device 30 including an image shooting device 35 (see FIG. 3) such as the smartphone described above is categorized as the VST display. The head-mounted display (HMD) described above is categorized as the OST display because a scene in the real world is viewed through lenses of the glasses serving as the display unit.

Figure 5:
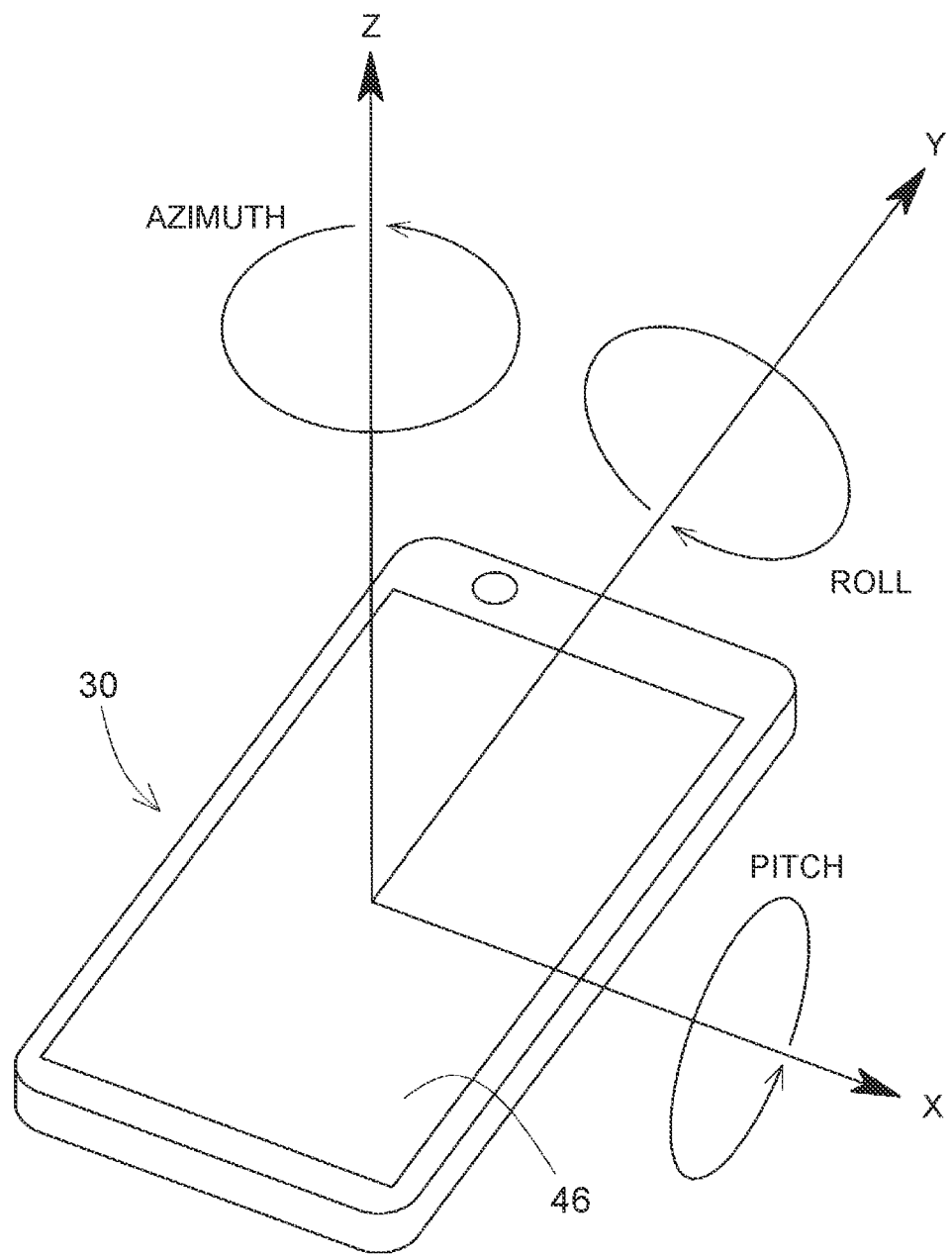
FIG. 5 is a diagram illustrating a smartphone as an example of a display device.

In the following embodiment, a mobile VST-display smartphone is exemplified as the display device 30 in FIG. 5. This smartphone may be owned by a visitor to the entertainment complex 10, or may be a leasable item as typified by a tablet terminal to be leased to a visitor to the entertainment complex 10.

FIG. 3 exemplifies the hardware configuration of the display device 30. The display device 30 includes a central processing unit (CPU) 31, an acceleration sensor 32, a gyro sensor 33, a geomagnetic sensor 34, the image shooting device 35, a GPS receiver 36, and the beacon receiver 37. The display device 30 further includes an input/output controller 39, a system memory 40, a storage device 41, a graphics processing unit (GPU) 42, a frame memory 43, a random access memory digital-to-analog converter (RAM-DAC) 44, a display controller 45, a display unit 46, and an inputter 47.

The system memory 40 is a storage to be used by an operating system (OS) executed by the CPU 31. The storage device 41 is an external storage that stores, for example, a program for displaying a virtual reality image (AR image) described later.

A direction and an azimuth of the display device 30 can be estimated by using the acceleration sensor 32, the gyro sensor 33, and the geomagnetic sensor 34. The acceleration sensor 32 measures an acceleration of the display device 30. As exemplified in FIG. 5, the acceleration sensor 32 can measure accelerations in three orthogonal axial directions. That is, the acceleration sensor 32 measures accelerations in directions of an X axis and a Y axis orthogonal to each other and parallel to a display surface of the display unit 46, and a Z axis orthogonal to the display surface of the display unit 46. The acceleration sensor 32, the gyro sensor 33, and the geomagnetic sensor 34 are constructed from so-called micromachines such as Micro Electro Mechanical Systems (MEMS).

The gyro sensor 33 measures an angular velocity of the display device 30. As exemplified in FIG. 5, the gyro sensor 33 measures rotations about the three orthogonal axes. That is, the gyro sensor 33 measures a pitch angle corresponding to a rotation about the X axis, a roll angle corresponding to a rotation about the Y axis, and an azimuth angle (also referred to as "yaw angle") corresponding to a rotation about the Z axis. The geomagnetic sensor 34 detects an inclination of the display device 30 from the magnetic north.

For example, the image shooting device 35 is a camera device mounted on the smartphone, and can shoot a still or moving image of a scene in the real world. The image shooting device 35 includes an image pickup device such as a complementary metal oxide semiconductor (CMOS) or a charge-coupled device (CCD). The image shooting device 35 may be a so-called RGB-D camera having a function of measuring a separation distance from the image shooting device 35 in addition to the function of shooting the real world. For the function of measuring a separation distance, the image shooting device 35 includes, for example, a distance measuring mechanism using an infrared ray in addition to the image pickup device.

The GPU 42 is an image processor, and mainly operates for image recognition described later. The frame memory 43 is a storage that stores an image shot by the image shooting device 35 and subjected to arithmetic processing by the GPU 42. The RAMDAC 44 converts image data stored in the frame memory 43 into an analog signal for the display unit 46 that is an analog display.

The GPS receiver 36 receives a GPS signal that is a positioning signal from a GPS satellite 24 (see FIG. 1). The GPS signal includes position coordinate information indicating a latitude, a longitude, and an altitude. The beacon receiver 37 receives a position signal output from any beacon transmitter 22 in the entertainment complex 10.

The position estimating functions of the GPS receiver 36 and the beacon receiver 37 overlap each other. Therefore, the display device 30 may include only one of the GPS receiver 36 and the beacon receiver 37.

The inputter 47 can input an activation command and an image shooting command to the image shooting device 35. Examples of the inputter 47 include a touch panel integrated with the display unit 46.

Figure 6:
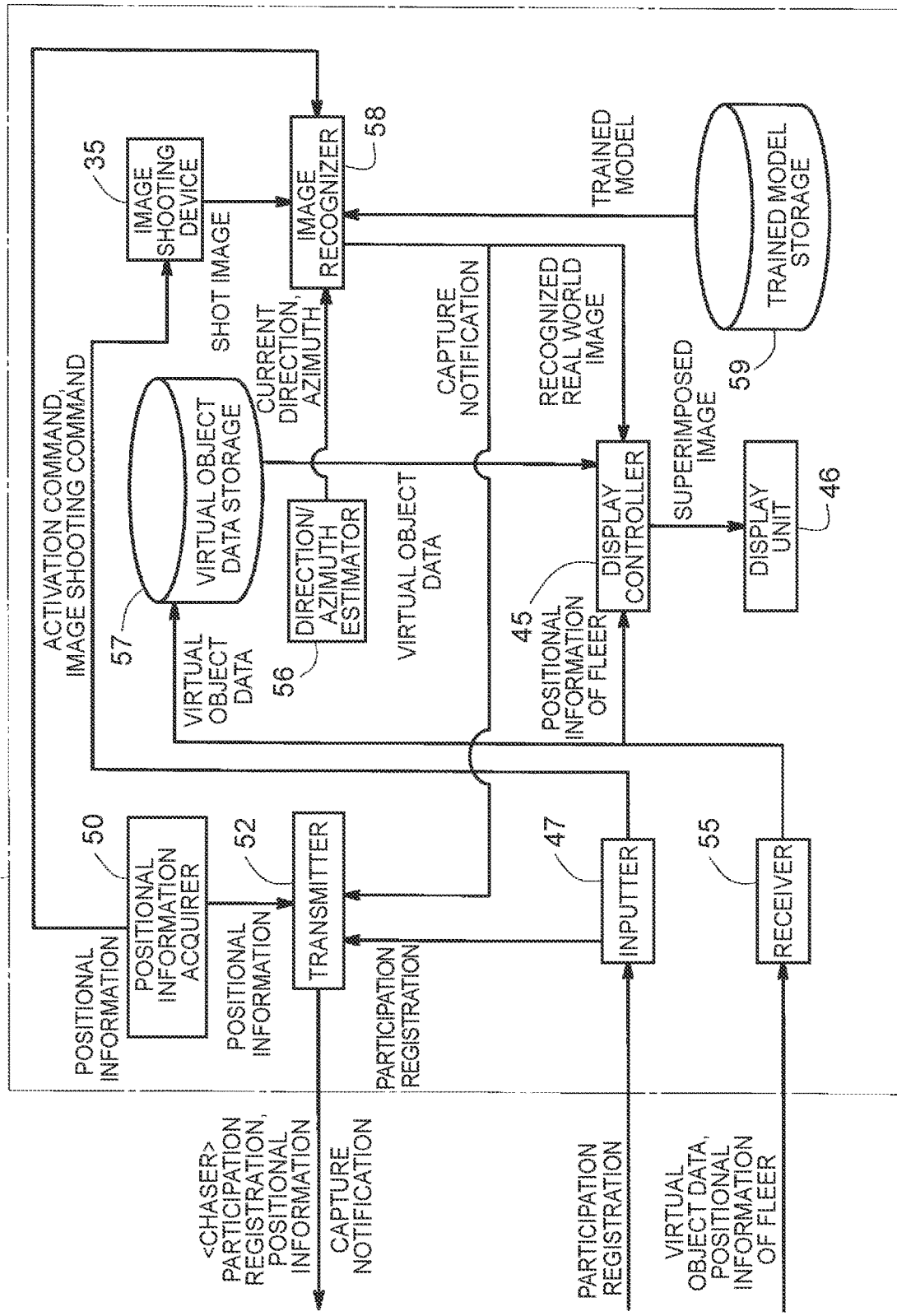
FIG. 6 is a diagram exemplifying functional blocks of the display device according to the embodiment.

FIG. 6 exemplifies functional blocks of the display device 30. For example, the functional blocks are implemented such that the CPU 31 and the GPU 42 execute programs stored in the system memory 40 and the storage device 41. Alternatively, the functional blocks exemplified in FIG. 6 are implemented such that the CPU 31 and the GPU 42 execute programs stored in a non-transitory computer-readable storage medium such as a DVD or a hard disk drive of a computer.

FIG. 6 illustrates the configuration of the display device 30 in a mixture of the functional blocks and a part of the hardware configuration exemplified in FIG. 3. FIG. 6 exemplifies the image shooting device 35, the display controller 45, the inputter 47, and the display unit 46 as the hardware configuration.

The display device 30 includes a positional information acquirer 50, a transmitter 52, a receiver 55, a direction/azimuth estimator 56, and an image recognizer 58 as the functional blocks. The display device 30 includes a virtual object data storage 57 and a trained model storage 59 as storages. Those functional blocks are implemented by the CPU 31, the system memory 40, the storage device 41, the GPU 42, and the frame memory 43.

The positional information acquirer 50 acquires information on a current position of the display device 30 from at least one of the GPS receiver 36 and the beacon receiver 37 of FIG. 3. The positional information is positional information in the so-called world coordinate system. In a case of a GPS signal, the positional information is included in positional information in a space coordinate system, including information on a latitude, a longitude, and an altitude. In a case where the received positional information is acquired from a beacon signal, the positional information in the world coordinate system includes, for example, an x-coordinate, a y-coordinate, and a z-coordinate in the space coordinate system having the origin at an arbitrary point in the entertainment complex 10. The x-coordinate and the y-coordinate may be defined on orthogonal coordinate axes on a horizon plane, and the z-coordinate may be defined on a vertical axis.

The direction/azimuth estimator 56 estimates a direction and an azimuth of the display device 30. The direction/azimuth estimator 56 includes the acceleration sensor 32 (see FIG. 3), the gyro sensor 33, and the geomagnetic sensor 34. The geomagnetic sensor 34 can detect an inclination of the display device 30 from the magnetic north. The acceleration sensor 32 and the gyro sensor 33 detect an inclination in the Cartesian coordinate system illustrated in FIG. 5. For example, a direction of an optical axis of the image shooting device 35 relative to the magnetic north can be determined.

The image recognizer 58 receives shot image data from the image shooting device 35 to execute image recognition. The image recognition includes recognition of a real object in a shot image, and estimation of a separation distance between the recognized real object and the display device 30. For such image recognition, the shot image data includes, for example, color image data obtained by shooting a scene in the real world, and data on a separation distance between the image shooting device 35 and each pixel in the color image data.

The image recognizer 58 recognizes a real object in a shot image by using a learning model for image recognition that is stored in the trained model storage 59. For example, the trained model storage 59 stores a neural network for image recognition that is trained by an external server. For example, data indicating an image of outdoors including the entertainment complex 10 and subjected to segmentation and annotation of each object in the image is prepared as training data. A multi-layer neural network is formed by supervised machine learning using the training data, and is stored in the trained model storage 59. Examples of the neural network include a convolutional neural network (CNN).

As described above, the image shooting device 35 is the RGB-D camera having the distance measuring function, and can acquire a separation distance between the image shooting device 35 and each pixel in a shot image. A separation distance between the image shooting device 35 and a real object in the shot image that is recognized through the image recognition is determined by using the separation distance. Thus, positional information in a so-called local coordinate system is obtained for each real object in the shot image. The origin of the local coordinate system is set to a predetermined point (for example, a focal point) on the image shooting device 35.

Based on the direction of the image shooting device 35 that is determined by the direction/azimuth estimator 56 and the position of the display device 30 in the world coordinate system that is acquired by the positional information acquirer 50, a position in the world coordinate system (position in the space coordinate system) can be determined for the real object in the shot image.

Although the shot image shows a distant real object in a depth direction, a fleer (character) near a chaser is generally captured in the chasing game. For example, when distance information obtained for each pixel in the shot image indicates a distance larger than a predetermined separation distance (for example, 100 m), the position in the world coordinate system need not be determined for that pixel.

The virtual object data storage 57 stores image data of a virtual object serving as a fleer, that is, a character. The virtual object data storage 57 may store pieces of character image data in all the areas 14A, 16A, and 18A. For example, the virtual object data storage 57 stores one arbitrary type of character image data in each of the areas 14A, 16A, and 18A. Each piece of character image data is associated with positional information. For example, each piece of character image data is associated with a range of position coordinates in which the virtual object can be displayed.

The display controller 45 can generate an augmented reality image (AR image) by superimposing an image of a virtual object on a scene in the real world, and cause the display unit 46 to display the AR image. For example, the display controller 45 superimposes an image of a character that is the virtual object on an image obtained by shooting the scene in the real world with the image shooting device 35, and causes the display unit 46 to display the superimposed image. Examples of the display unit 46 include a liquid crystal display and an organic electroluminescence (EL) display.

Figure 10:
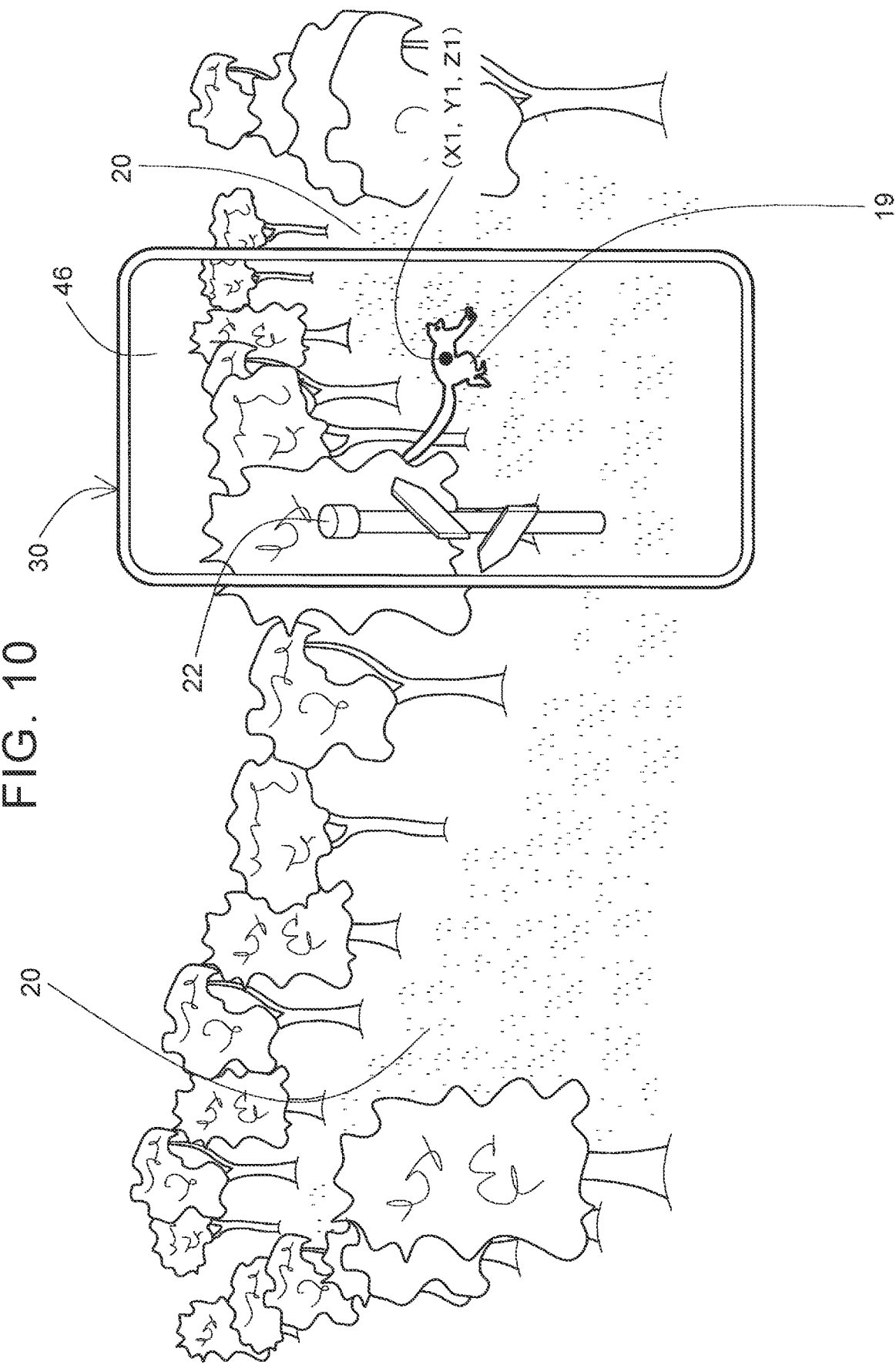
FIG. 10 is a diagram exemplifying a shot image obtained by shooting the scene of FIG. 9 by using the display device.

As illustrated in FIG. 10, the display controller 45 generates an augmented reality image by superimposing an image of a fleer virtual object in the chasing game on an image shot by the image shooting device 35. The display controller 45 acquires positional information (designated position) of the fleer (virtual object) from the server 70. The display controller 45 superimposes a character image that is the image of the fleer at the designated position in the shot image. At this time, a character image based on the designated position, that is, included in the designated position and set for the area 14A, 16A, or 18A is selected as the character image to be superimposed.

Since a fleer (character) near a chaser is generally captured in the chasing game, the character image need not be superimposed on the shot image for a fleer associated with a designated position at a distance larger than a predetermined separation distance (for example, 100 m).

Configuration of Remote Terminal Device

The remote terminal device 100 is a manipulation device to be manipulated by the manipulator 94 (see FIG. 1) at the place remote from the entertainment complex 10. Although FIG. 1 illustrates one remote terminal device 100 and one manipulator 94, a plurality of remote terminal devices 100 is communicable with the server 70, and therefore a plurality of manipulators 94 can participate in the chasing game as fleers.

Examples of the remote terminal device 100 (manipulation device) include a computer. Referring to FIG. 3, the remote terminal device 100 includes a CPU 101 serving as a processor, and a system memory 102 and a storage device 104 serving as storages.

The remote terminal device 100 includes a display unit 106, and a display controller 105 configured to control images to be displayed on the display unit 106. The remote terminal device 100 includes an input/output controller 103 configured to manage input and output of information. The remote terminal device 100 is communicable with the server 70 by a communication method such as the Internet.

The remote terminal device 100 includes an inputter 107 configured to input information. Examples of the inputter 107 include a mouse and a keyboard that can input a manipulation command for a fleer. As described later, the manipulation command for the fleer includes a command to set a position (designated position) of a fleer virtual object.

Figure 7:
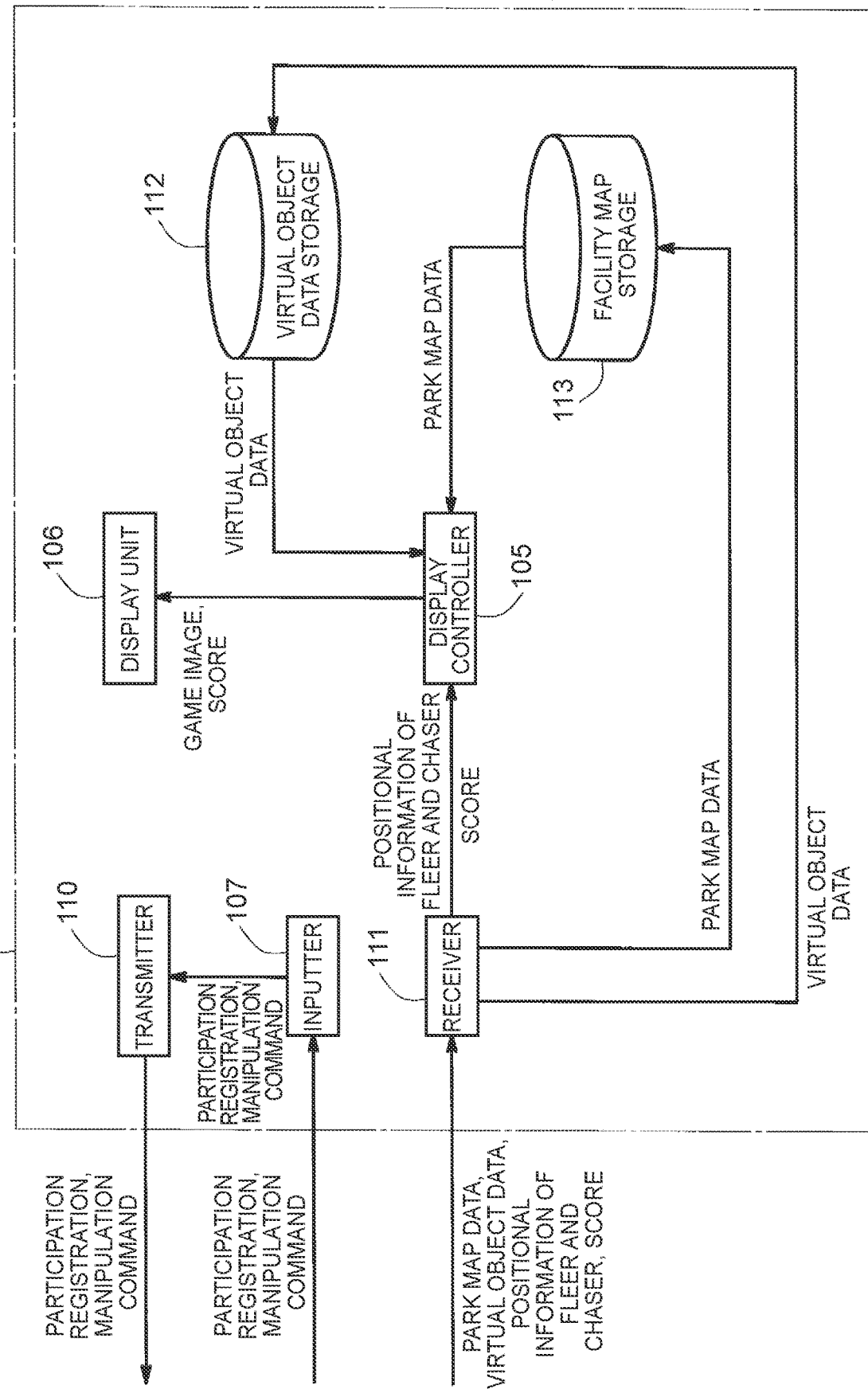
FIG. 7 is a diagram exemplifying functional blocks of a remote terminal device serving as a manipulation device according to the embodiment.

FIG. 7 exemplifies functional blocks of the remote terminal device 100 together with the hardware configuration in FIG. 3. The remote terminal device 100 includes a transmitter 110, a receiver 111, a virtual object data storage 112, and a facility map storage 113 as the functional blocks.

The virtual object data storage 112 stores image data of a character that is a fleer virtual object. The character image data is associated with positional information. For example, a range of position coordinates in the entertainment complex 10 in which display of an image of the fleer virtual object is permitted is stored in the virtual object data storage 112 in association with the character image data.

The facility map storage 113 stores park map data in the entertainment complex 10. The park map data may be identical to the park map data stored in the facility map storage 81 of the server 70 (see FIG. 4).

Figure 14:
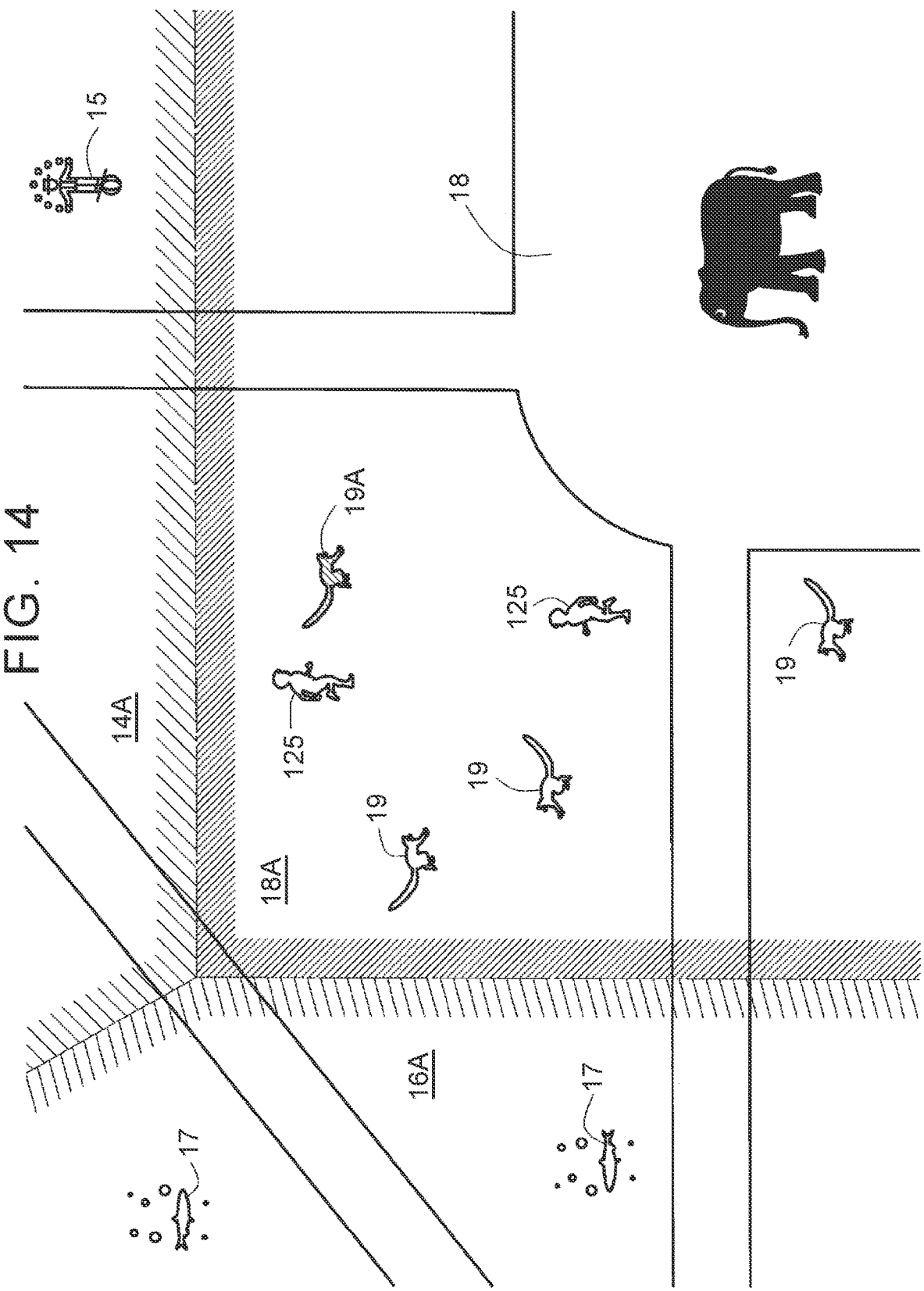
FIG. 14 is a diagram exemplifying a game image displayed on a display unit of the remote terminal device.

The display controller 105 generates a game image by superimposing images of fleers and chasers in the entertainment complex 10 on an image of a park map, that is, a plane image of the entertainment complex 10 as illustrated in FIG. 14. For example, pieces of information on current positions of the fleers and the chasers are provided from the server 70. The display controller 105 superimposes the images of the fleers and the chasers on the park map at the current positions provided from the server 70.

Flow on Chaser Side in Chasing Game

Figure 8:
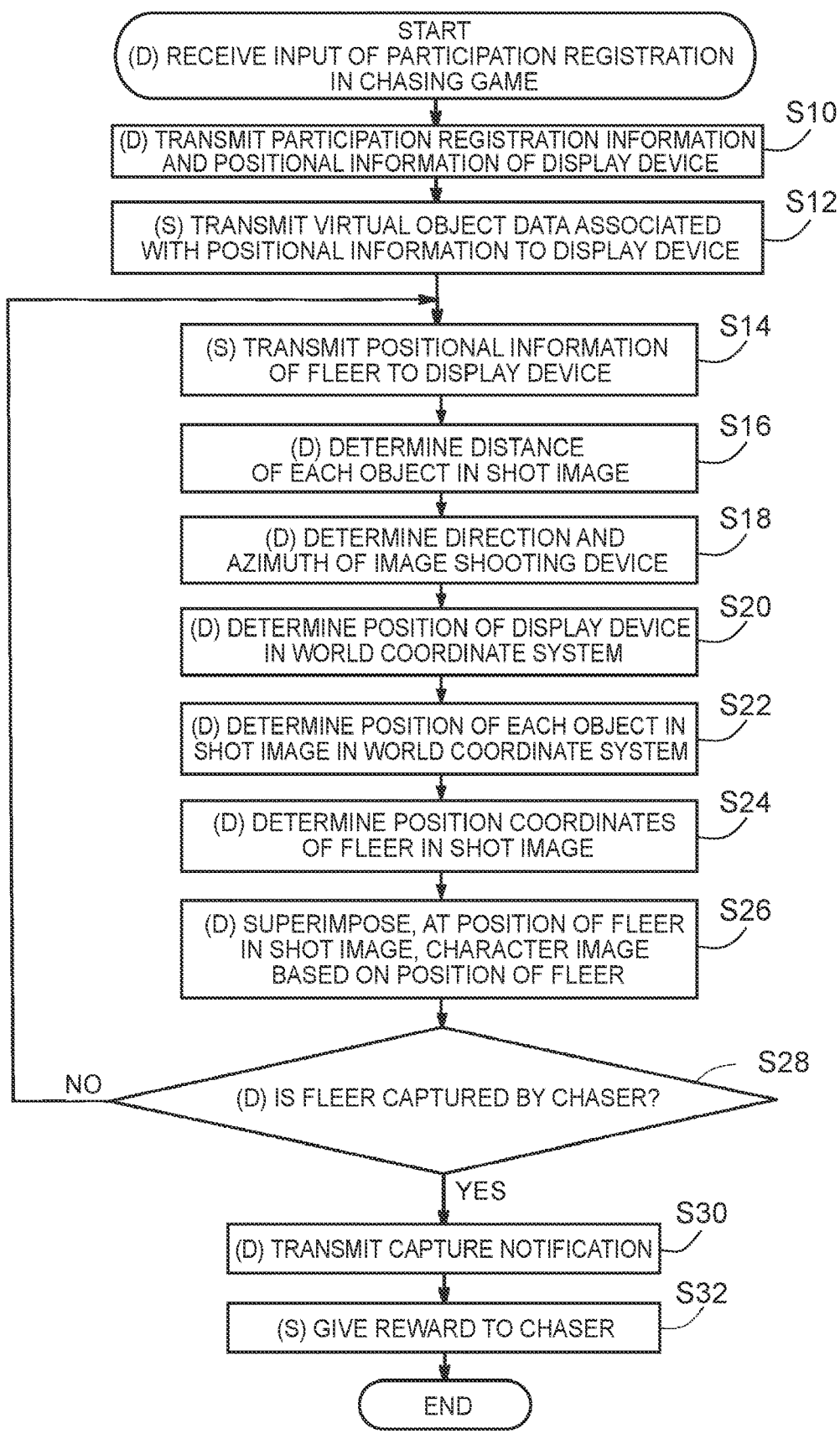
FIG. 8 is a diagram exemplifying a chaser flow in a chasing game using the display system according to the embodiment.

FIG. 8 exemplifies a flow on a chaser side in the chasing game serving as the AR game using the display system according to this embodiment. In the chaser-side flow, the server 70 and the display device 30 mainly execute steps. Among the steps of FIG. 8, steps represented by "(S)" are executed by the server 70. Steps represented by "(D)" are executed by the display device 30.

Referring to FIG. 4, FIG. 6, and FIG. 8, the chaser flow is started when a request for participation registration in the chasing game is input to the inputter 47 of the display device 30 in the entertainment complex 10. In response to the input of the request for participation registration, the positional information acquirer 50 of the display device 30 acquires a current position of the display device 30. The current position is position coordinates in the world coordinate system. In response to the input of the request for participation registration, the image shooting device 35 is activated to shoot a scene in the entertainment complex 10.

The positional information acquired by the positional information acquirer 50 and the participation registration information input from the inputter 47 are transmitted from the transmitter 52 to the server 70 (S10). The receiver 83 of the server 70 transmits the positional information and the participation registration information of the display device 30 to the participant calculator 84. The receiver 83 transmits the positional information of the display device 30 to the 3D model extractor 86.

The 3D model extractor 86 extracts virtual object data from the theme park-specific character storage 82. As described above, the virtual object data includes character image data and positional information data (display area data) associated with the character image data. The virtual object data is transmitted from the transmitter 87 to the display device 30 (S12).

The participant calculator 84 stores the positional information and the participation registration information received from the receiver 83 in the chasing game participant storage 80. The participant calculator 84 acquires information on participants in the chasing game from the chasing game participant storage 80. This information includes positional information of a fleer. The positional information of the fleer may be positional information of every fleer participating in the chasing game. Alternatively, the positional information of the fleer may be positional information of a fleer within a range of a predetermined distance from the display device 30. For example, the participant calculator 84 acquires positional information of a fleer within an area of 100-m radius from the position of the display device 30. The positional information of the fleer may be position coordinate information in the world coordinate system. The participant calculator 84 transmits the acquired positional information of the fleer to the display device 30 (S14).

The image recognizer 58 of the display device 30 executes image recognition on an image shot by the image shooting device 35, and segmentation and annotation on real objects in the shot image. Based on the distance measuring function of the image shooting device 35, the image recognizer 58 determines a separation distance between the display device 30 and each recognized real object (S16).

Next, the image recognizer 58 causes the direction/azimuth estimator 56 to determine a direction and an azimuth of the optical axis of the image shooting device 35 (S18). For example, the image recognizer 58 determines an azimuth (angle) of the optical axis of the image shooting device 35 relative to the magnetic north, and rotation angles (direction) about three orthogonal axes including the optical axis.

The image recognizer 58 causes the positional information acquirer 50 to determine a position of the display device 30 in the world coordinate system (S20). The image recognizer 58 determines positions of the real objects in the shot image in the world coordinate system (S22). The shot image, the pieces of information on the real objects recognized in the image, and the pieces of positional information of the real objects in the world coordinate system are transmitted to the display controller 45.

The display controller 45 determines position coordinates of fleers in the shot image (S24). For example, the display controller 45 determines whether position coordinates of a plurality of fleers that are transmitted from the server 70 are in the shot image.

The display controller 45 superimposes character images that are virtual object images at the positions (designated positions) of the fleers in the shot image (S26). At this time, the character images to be superimposed are selected based on the pieces of positional information of the fleers. For example, character images set for the area 14A, 16A, or 18A including the positions of the fleers are selected and superimposed on the shot image.

Figure 9:
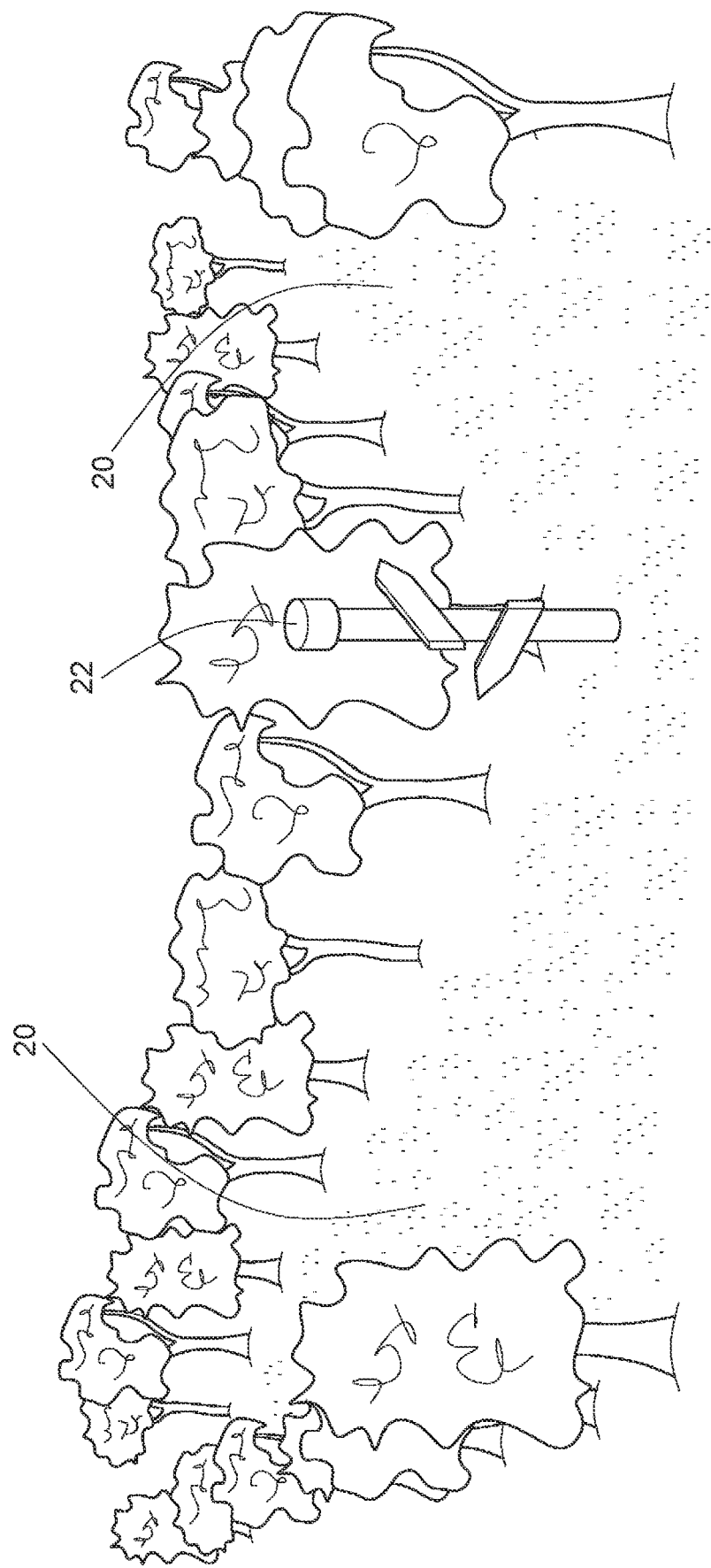
FIG. 9 is a diagram exemplifying a scene in the entertainment complex.

FIG. 9 exemplifies a scene in the entertainment complex 10. FIG. 10 illustrates an example in which the scene is shot by the image shooting device 35 of the display device 30 and the shot image is displayed on the display unit 46. In this example, the shot image includes a designated position (X1, Y1, Z1) of a fleer, and a character image 19 is superimposed at the designated position. In this example, the designated position (X1, Y1, Z1) is in the zoo area 18A (see FIG. 2), and a character image 19 showing a monkey set for this area is superimposed on the shot image.

Figure 11:
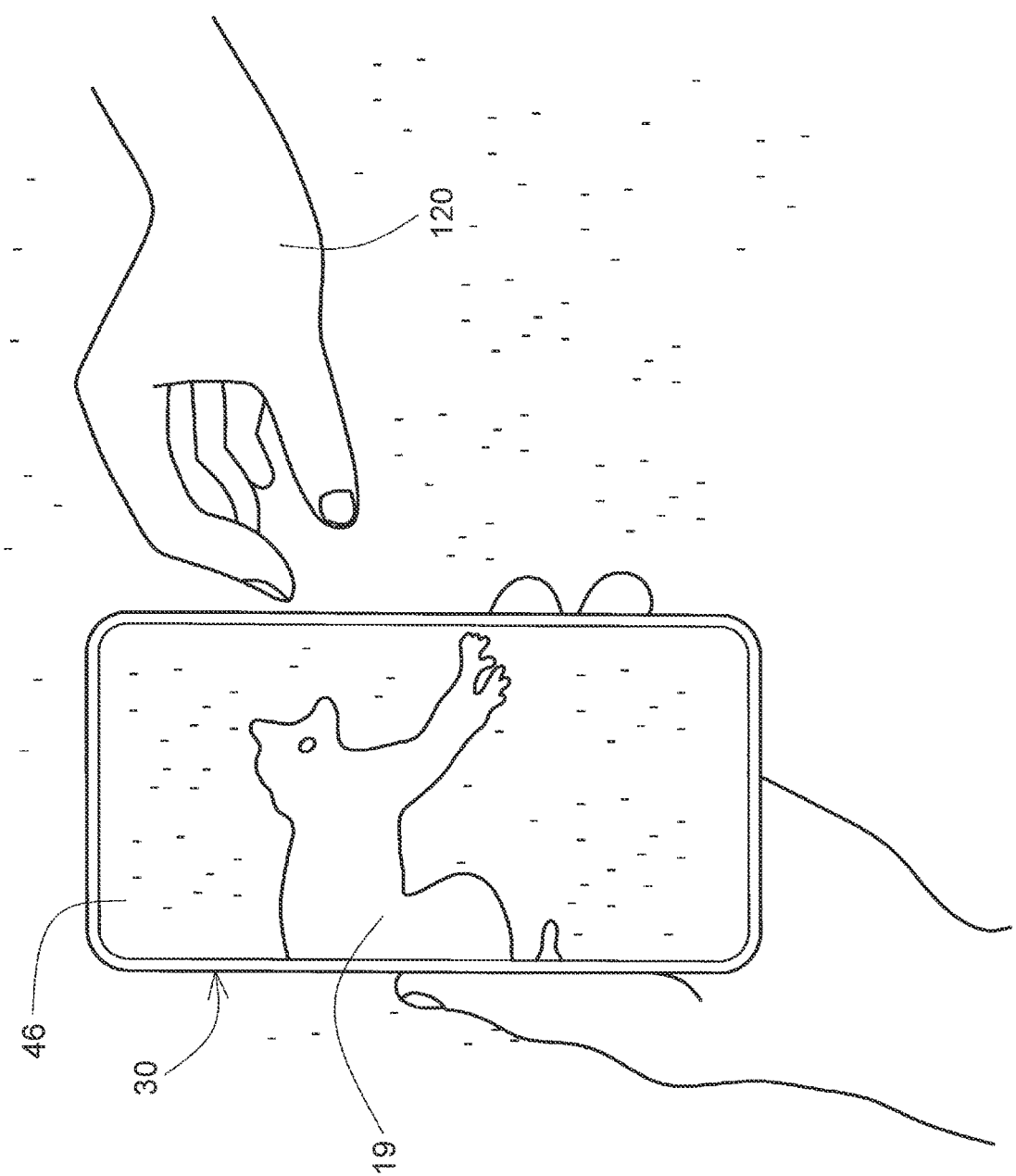
FIG. 11 is a diagram exemplifying a process of capturing a virtual object (1/2)

The image recognizer 58 determines whether the virtual object is captured (S28). Referring to FIG. 11, a hand 120 of the chaser enters an image shooting field of the image shooting device 35 with the character image 19 displayed on the display unit 46. That is, the hand 120 enters an opposite side of the display unit 46.

Figure 12:
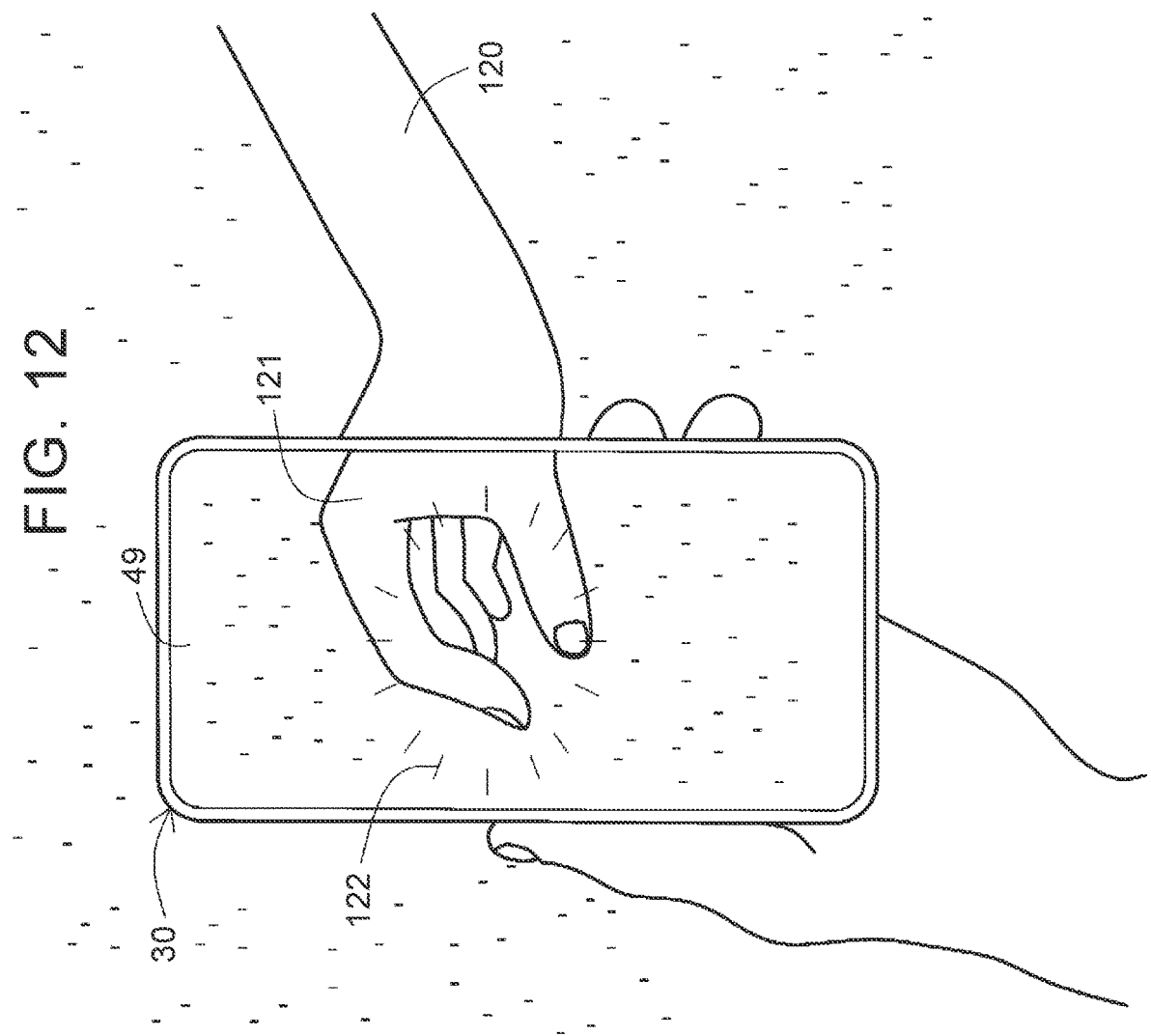
FIG. 12 is a diagram exemplifying the process of capturing the virtual object (2/2)

The hand 120 of the chaser is shot by the image shooting device 35 and recognized by the image recognizer 58. As exemplified in FIG. 12, when the position of a hand 121 of the chaser that is a real object in the shot image agrees with the designated position of the virtual object and the hand 121 makes a predetermined gesture, the image recognizer 58 recognizes the gesture. Through the gesture recognition, the image recognizer 58 determines that the fleer virtual object is captured by the chaser as exemplified in FIG. 12. The gesture may be any action (capturing action) for capturing the character image that is the virtual object image with the hand 120 on the display unit 46. When the image recognizer 58 recognizes the capturing action for the character image, the image recognizer 58 transmits a capture notification to the server 70 via the transmitter 52 (S30). The capture notification includes an identification symbol of the chaser (display device 30), the capturing position, and an identification symbol of the captured fleer.

When the image recognizer 58 determines that the fleer is captured, the display controller 45 executes image processing on the virtual object when captured. As exemplified in FIG. 12, the display controller 45 causes the display unit 46 to display a radial line image 122 indicating that the character image 19 has disappeared.

The capture notification is transmitted to the reward calculator 85 of the server 70. The reward calculator 85 gives a reward for the capture to the chaser (S32). For example, a score is transmitted to the display device 30 as the reward. The score is displayed on the display unit 46 of the display device 30. When the fleer is captured, the chasing game of the chaser who has captured the fleer is terminated.

When the image recognizer 58 determines in Step S28 that the fleer (virtual object) is not captured by the chaser, the flow returns to Step S14 and the position coordinates of the fleers are acquired from the server 70 again.

As described above, the chaser in the chasing game can enjoy the game of chasing the virtual object (fleer) displayed on the display unit 46 of the display device 30. The character image associated with the area 14A, 16A, or 18A where the virtual object is located is selected as the image of the virtual object to be displayed on the display unit 46. For example, the displayed character image is changed when the position coordinates of the virtual object moves beyond the area. This display control can provide a representation harmonized with each of the worlds of the theme parks 14, 16, and 18 in the entertainment complex 10.

Flow on Fleer Side in Chasing Game

Figure 13:
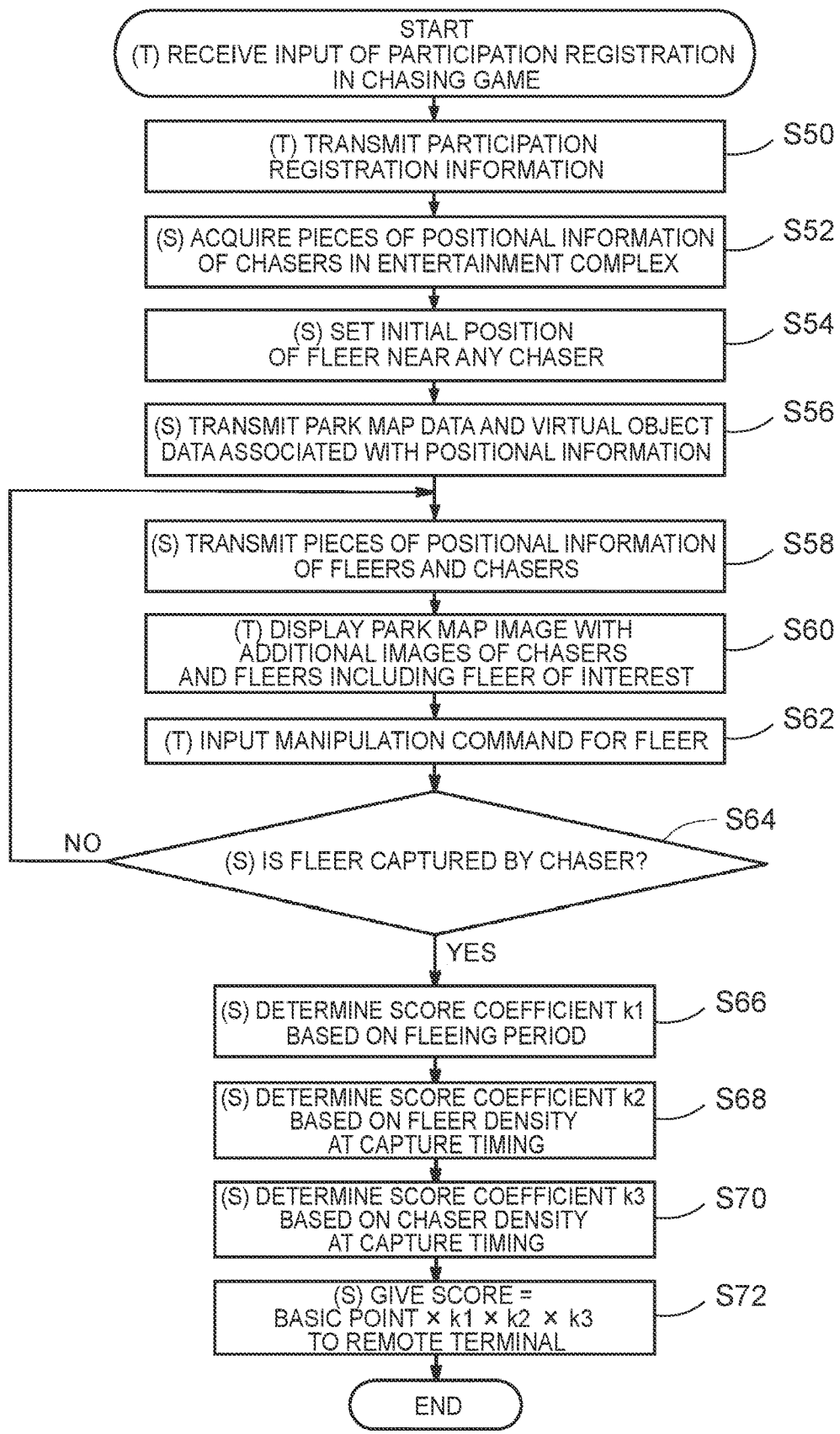
FIG. 13 is a diagram exemplifying a fleer flow in the chasing game using the display system according to the embodiment.

FIG. 13 exemplifies a flow on a fleer side in the chasing game. In this flow, the server 70 and the remote terminal device 100 mainly execute steps. In FIG. 13, steps represented by "(S)" are executed by the server 70, and steps represented by "(T)" are executed by the remote terminal device 100. Referring to FIG. 4, FIG. 7, and FIG. 13, the flow of FIG. 13 (fleer-side flow) is started when a request for participation registration in the chasing game is input to the inputter 107 of the remote terminal device 100.

The remote terminal device 100 transmits the participation registration information to the server 70 (S50). The participation registration information includes an identification symbol of the remote terminal device 100 or its manipulator 94 (see FIG. 1). The receiver 83 of the server 70 that has received the participation registration information transmits the information to the participant calculator 84. The participant calculator 84 stores the participation registration information in the chasing game participant storage 80.

The participant calculator 84 acquires pieces of positional information of all currently participating chasers from the chasing game participant storage 80 (S52). Next, the participant calculator 84 sets an initial position of the fleer near any chaser (S54). When a plurality of chasers is participating, any chaser is randomly selected and the initial position of the fleer is set near the chaser. For example, the area near the chaser is a range of 1-m radius from the position of the chaser.

The participant calculator 84 acquires the park map data from the facility map storage 81, and transmits the data to the remote terminal device 100 via the transmitter 87 (S56). The 3D model extractor 86 receives the participation registration information, and transmits virtual object data to the remote terminal device 100.

Next, the participant calculator 84 transmits the pieces of positional information of fleers and chasers to the remote terminal device 100 (S58). The pieces of positional information of the chasers include the pieces of positional information of all the chasers participating in the chasing game in the entertainment complex 10. Similarly, the pieces of positional information of the fleers include pieces of positional information of all the fleers participating in the chasing game in the entertainment complex 10. The positional information of the fleer also includes the information on the initial position of the fleer that is set in Step S54, that is, the information on the initial position of the fleer of interest.

In the remote terminal device 100, the virtual object data storage 112 stores the virtual object data. The facility map storage 113 stores the park map data. The display controller 105 generates a park map image as a game image by superimposing virtual object images of the chasers and the fleers including the fleer of interest, and causes the display unit 106 to display the park map image (S60).

FIG. 14 exemplifies the game image. In the game image, character images 15, 17, and 19 are superimposed on the park map image at the position coordinates of the fleers. The fleer character images 15, 17, and 19 are selected depending on which of the areas 14A, 16A, and 18A includes the positions of the fleers. A chaser character image 125 may be set uniformly irrespective of the areas 14A, 16A, and 18A.

A character image 19A representing the fleer manipulated by the manipulator via the remote terminal device 100 may be subjected to image processing such as hatching to discriminate from the other character images.

In response to the display of the game image on the display unit 106 as in FIG. 14, the manipulator 94 (see FIG. 1) inputs a manipulation command to the inputter 107 so that the manipulated fleer character image 19A can flee from the chasers (S62). That is, the manipulator 94 inputs a manipulation command to the inputter 107 to set the designated position of the fleer (virtual object) to a position more distant from the chasers than the current position.

The input manipulation command is transmitted to the server 70. The reward calculator 85 determines whether a capture notification about the character image 19A is transmitted from the display device 30 of any chaser (S64). When the capture notification about the character image 19A is not transmitted, the flow returns to Step S58.

When the capture notification about the character image 19A is transmitted to the server 70 in Step S64, the reward calculator 85 calculates a reward.

First, the reward calculator 85 determines a score coefficient k1 based on a fleeing period of the character image 19A (S66). For example, the fleeing period is a period from a start timing of manipulation of the character image 19A that is the virtual object to a timing of recognition of the capturing action, that is, a timing of output of the capture notification. The score coefficient k1 is set to increase in direct proportion to the fleeing period.

Next, the reward calculator 85 determines a score coefficient k2 based on a fleer density when the character image 19A is captured (S68). The fleer density may be referred to as "virtual object space density", and is a space density around the character image 19A that is the virtual object image. For example, a space density of virtual objects (fleers) within a range of 5-m radius from the position coordinates of the captured character image 19A is calculated as the fleer density. A space density of virtual objects (fleers) at the timing of recognition of the capturing action, that is, the timing of output of the capture notification is calculated as the fleer density.

As the fleer density increases, the fleer is less likely to be captured. Thus, the score coefficient k2 is set to decrease as the fleer density increases. For example, the fleer density and the score coefficient k2 have an inversely proportional relationship.

Next, the reward calculator 85 determines a score coefficient k3 based on a chaser density when the character image 19A is captured (S70). The chaser density may be referred to as "chaser space density", and is a space density of chasers around the character image 19A. For example, a space density of display devices 30 within a range of 5-m radius from the position coordinates of the character image 19A is calculated as the chaser density. A space density of display devices 30 at the timing of recognition of the capturing action, that is, the timing of output of the capture notification for the character image 19A is calculated as the chaser density.

As the chaser density increases, the fleer is more likely to be captured. Thus, the score coefficient k3 is set to increase as the chaser density increases. For example, the chaser density and the score coefficient k3 have a directly proportional relationship.

The reward calculator 85 calculates a score by multiplying a predetermined basic point by the score coefficients k1, k2, and k3, and gives the score to the remote terminal device 100 (S72). For example, the manipulator 94 (FIG. 1) who has manipulated the fleer via the remote terminal device 100 can receive a discount service based on the given score when visiting the entertainment complex 10.

According to the display system described above, the fleeing route of the fleer in the chasing game is determined by the manipulator of the remote terminal device 100. Thus, it is possible to avoid a case where the fleeing route of the fleer is provided in the same pattern.

The manipulator can participate in the event of the entertainment complex 10 at the place remote from the entertainment complex 10. In addition, the manipulator can receive the discount service when visiting the entertainment complex 10. This service motivates the manipulator to manipulate the fleer. Thus, a sufficient number of fleers can appear in the chasing game.

The provider of the display system need not create an algorithm for setting the fleeing route of the fleer, thereby reducing development costs.

Other Example of Display System

Figure 15:
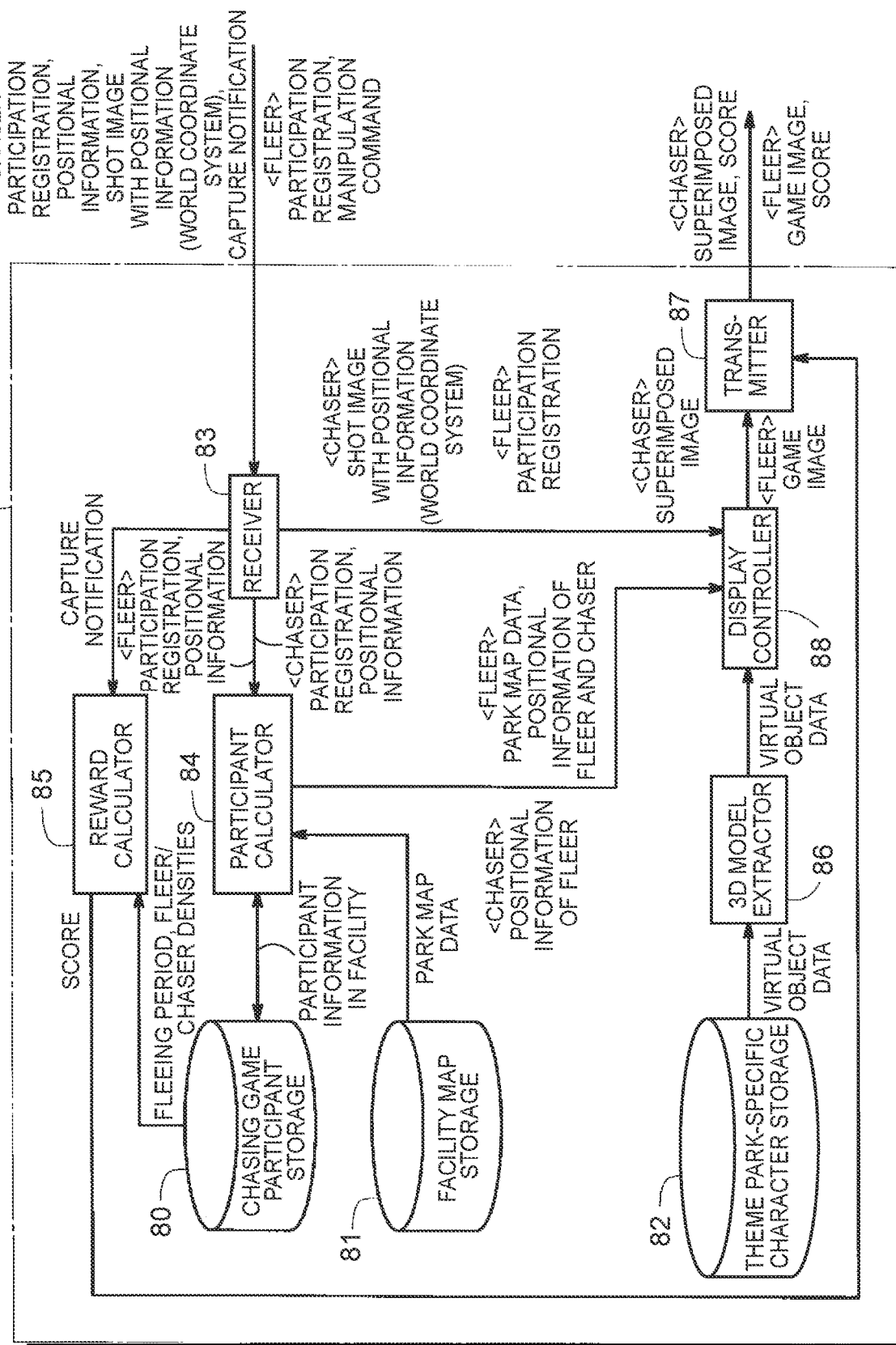
FIG. 15 is a diagram exemplifying functional blocks of a server according to another example of the embodiment.
Figure 16:
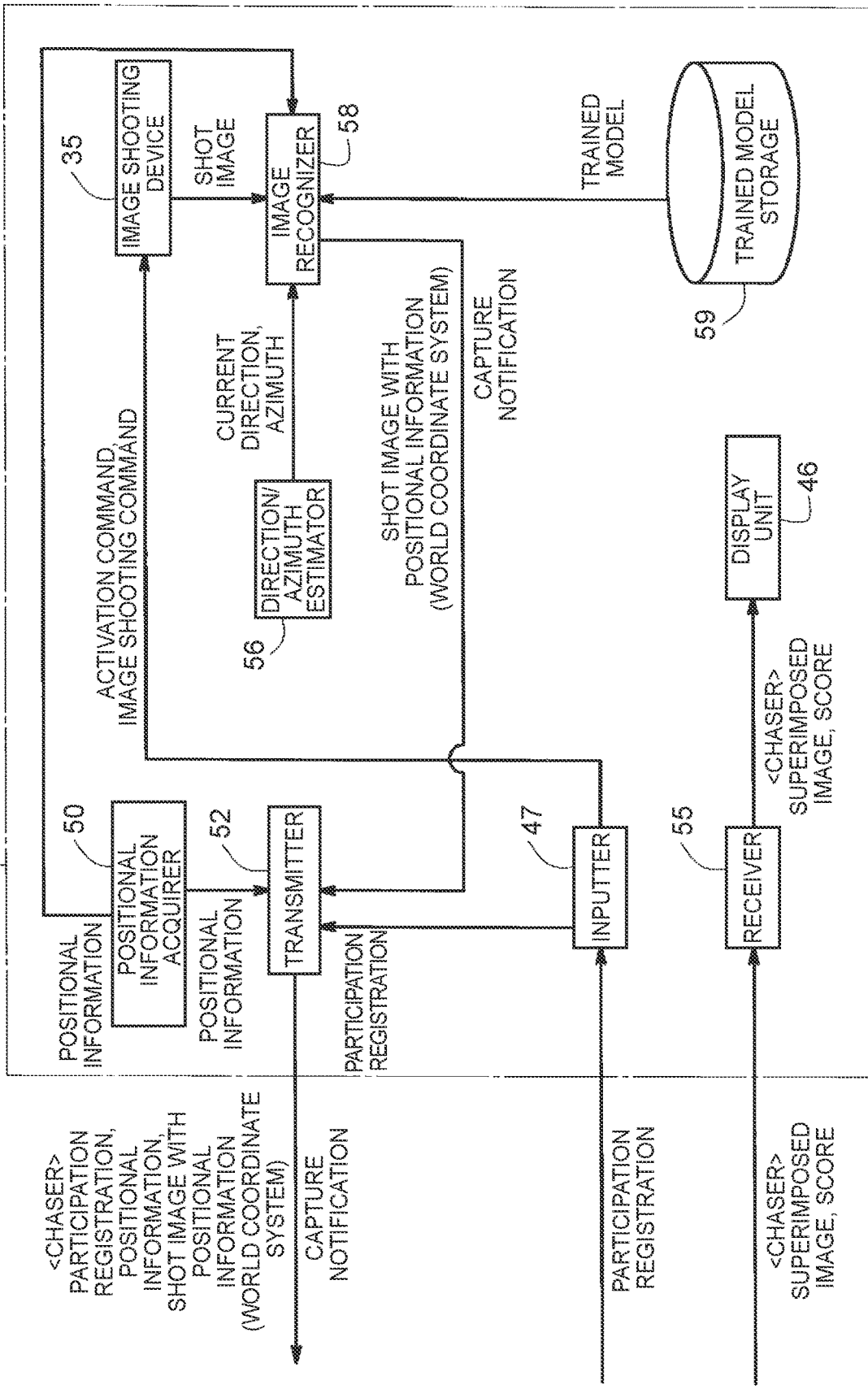
FIG. 16 is a diagram exemplifying functional blocks of a display device according to the other example of the embodiment.
Figure 17:
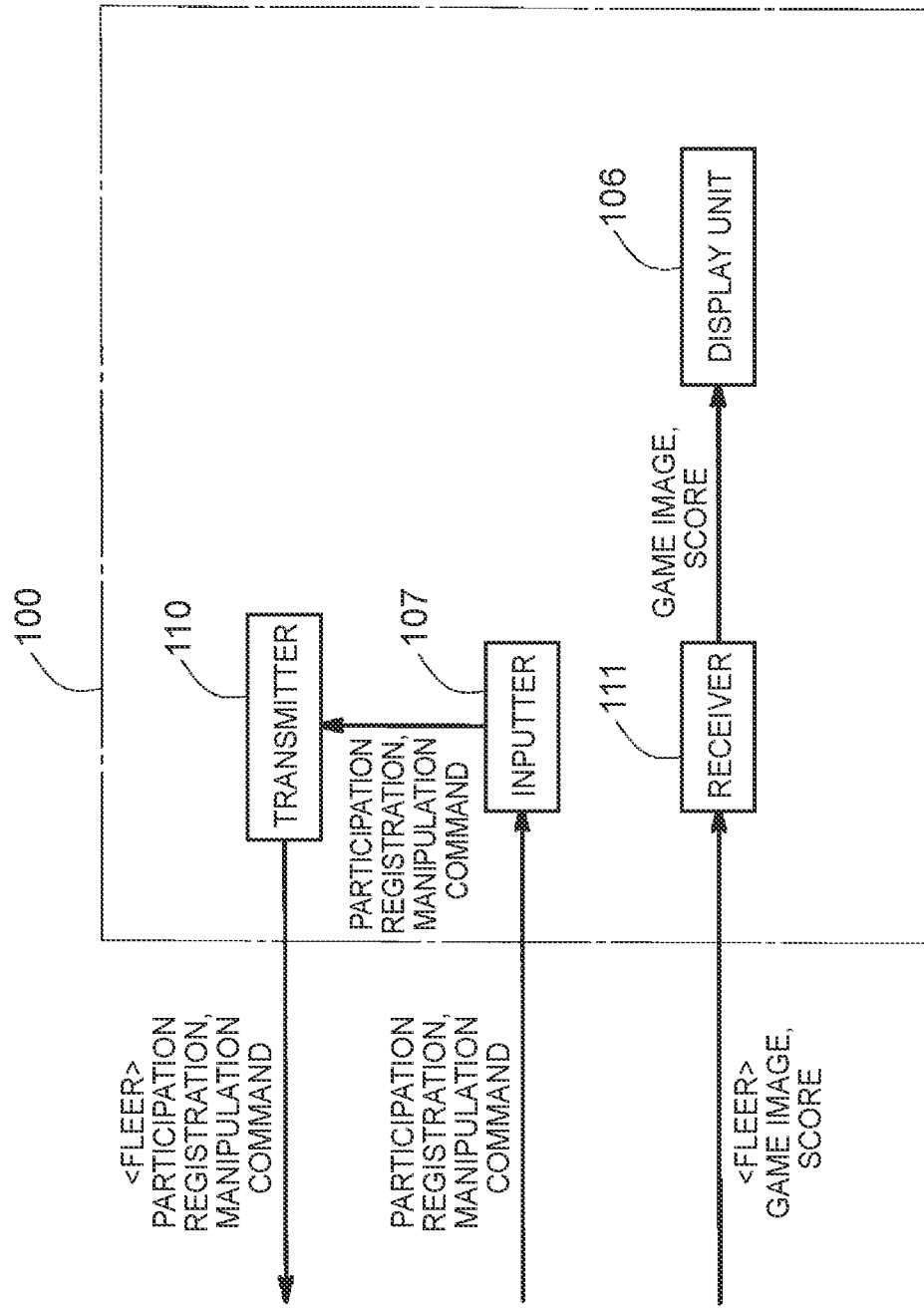
FIG. 17 is a diagram exemplifying functional blocks of a remote terminal device serving as the manipulation device according to the other example of the embodiment.

FIG. 15 to FIG. 17 illustrate another example of the display system according to this embodiment. In this system, the server 70 creates a superimposed image by superimposing images of fleer virtual objects on a shot image in the real world. Further, the server 70 creates a game image by superimposing images of fleers and chasers on the park map data.

Referring to FIG. 15, the server 70 includes a display controller 88 in addition to the functional blocks illustrated in FIG. 4. Functional blocks overlapping those in FIG. 4 have the same functions, and therefore description of those functional blocks is hereinafter omitted as appropriate. The display controller 88 has the functions of the display controller 45 of the display device 30 (see FIG. 6) and the display controller 105 of the remote terminal device 100 (see FIG. 7). That is, the display controller 88 generates an augmented reality image to be displayed on the display device 30 and a game image to be displayed on the remote terminal device 100.

Along with the display controller 88 provided in the server 70, the display controller 45 is omitted in the display device 30 as exemplified in FIG. 16. The virtual object data storage 57 is omitted as well. In the remote terminal device 100, the display controller 105, the virtual object data storage 112, and the facility map storage 113 are omitted as exemplified in FIG. 17.

Figure 18:
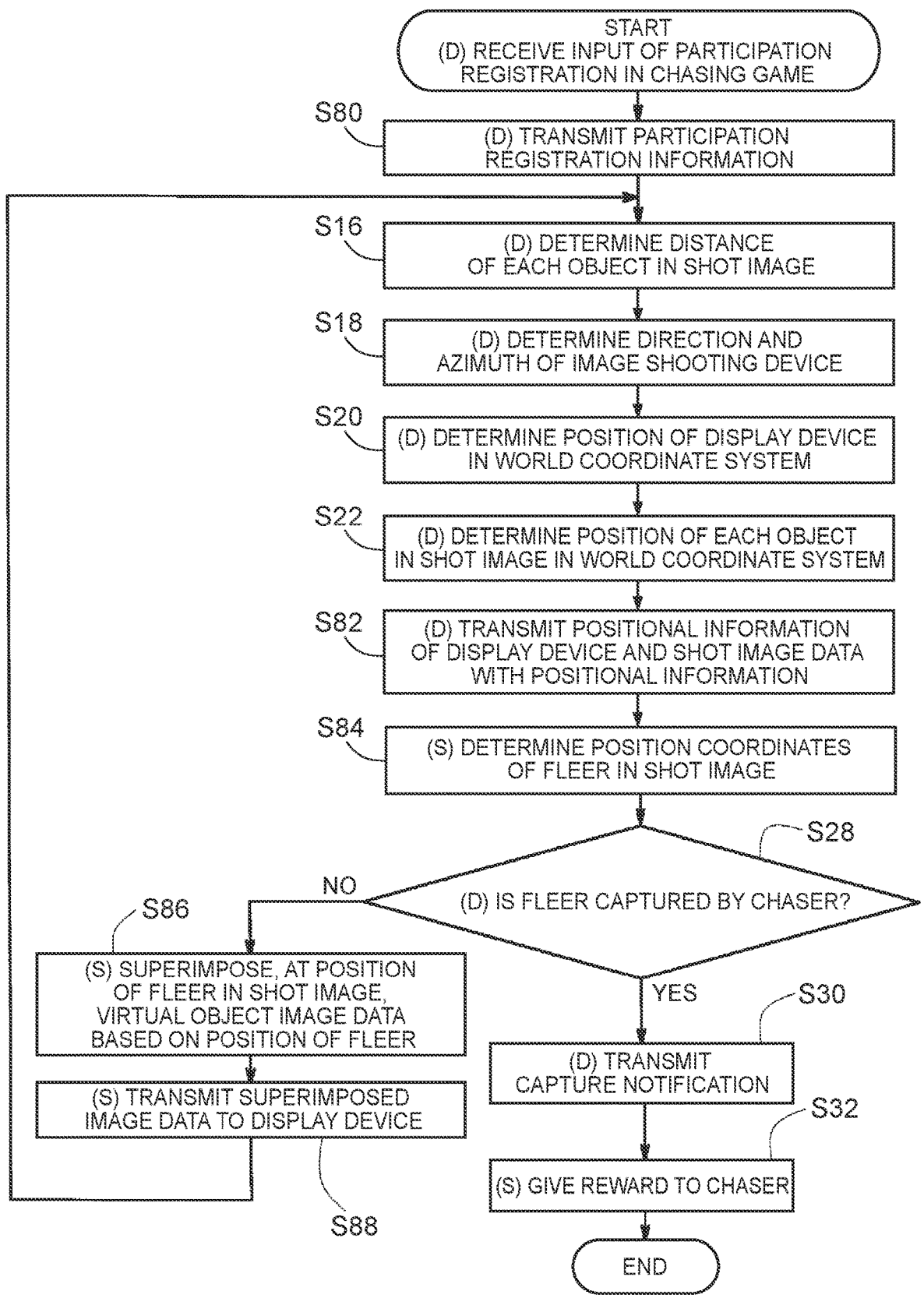
FIG. 18 is a diagram exemplifying a chaser flow in a chasing game using a display system according to the other example of the embodiment.

FIG. 18 exemplifies a chaser flow in the chasing game to be executed by the server 70 and the display device 30 of FIG. 15 and FIG. 16. Details of processes in steps represented by the same reference symbols as those in the chaser flow of FIG. 8 remain unchanged, and therefore description of those steps is hereinafter omitted as appropriate.

In response to participation registration in the chasing game on the display device 30, the display device 30 transmits participation registration information to the server 70. This information also includes positional information of the display device 30. The participation registration information is stored in the chasing game participant storage 80 of the server 70.

In Steps S16 to S22, real objects are recognized in a shot image, and pieces of positional information of the real objects in the world coordinate system are determined by the display device 30. Next, shot image data with the pieces of positional information is transmitted to the server 70 together with the positional information of the display device 30 (S82). The display controller 88 of the server 70 determines position coordinates of fleers in the shot image (S84).

When the fleers are not captured by the chaser (that is, a person carrying the display device 30), that is, the chasing game is still in progress in Step S28, the display controller 88 superimposes character images of fleer virtual objects at the positions of the fleers in the shot image (S86). The character images to be superimposed are determined based on the positions of the fleers. For example, character images set in association with the area 14A, 16A, or 18A including the positions of the fleers are superimposed on the shot image. The superimposed image (AR image) is transmitted from the server 70 to the display device 30 (S88).

Figure 19:
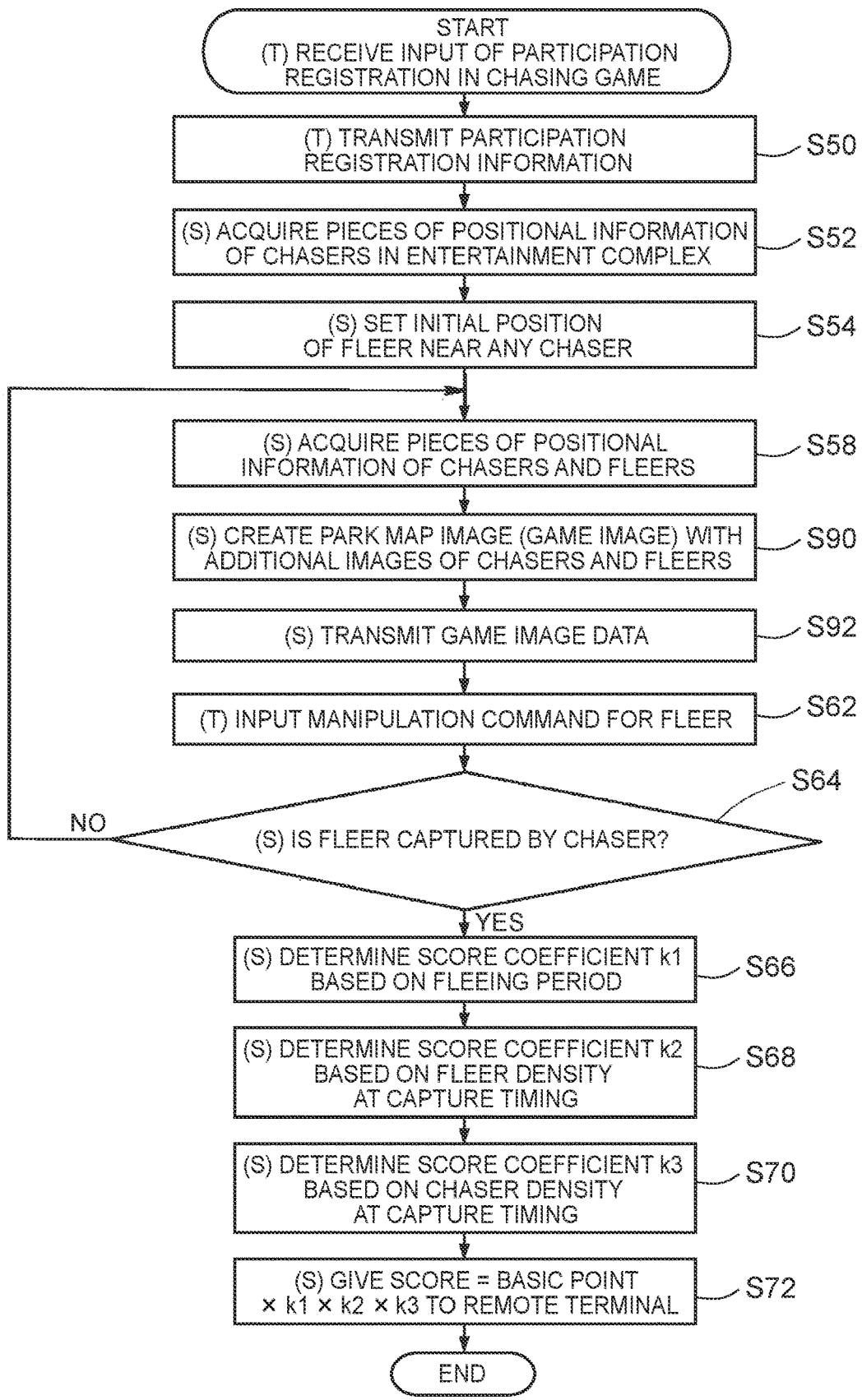
FIG. 19 is a diagram exemplifying a fleer flow in the chasing game using the display system according to the other example of the embodiment.

FIG. 19 exemplifies a fleer flow in the chasing game to be executed by the server 70 and the remote terminal device 100 of FIG. 15 and FIG. 17. Details of processes in steps represented by the same reference symbols as those in the fleer flow of FIG. 13 remain unchanged, and therefore description of those steps is hereinafter omitted as appropriate.

When the participant calculator 84 of the server 70 acquires pieces of positional information of chasers and fleers from the chasing game participant storage 80 in Step S58, the display controller 88 creates a game image by adding character images of the chasers and the fleers to the park map image (S90). An identification image such as hatching is added to the fleer associated with the remote terminal device 100 to which the game image will be transmitted. The created game image is transmitted to the remote terminal device 100 (S92), and is displayed on the display unit 106 of the remote terminal device 100.

According to the embodiment described above, the display controllers are omitted from the display device 30 and the remote terminal device 100. Thus, loads on those devices to create the augmented reality image and the game image are reduced.

Other Example of Display Device

Figure 20:
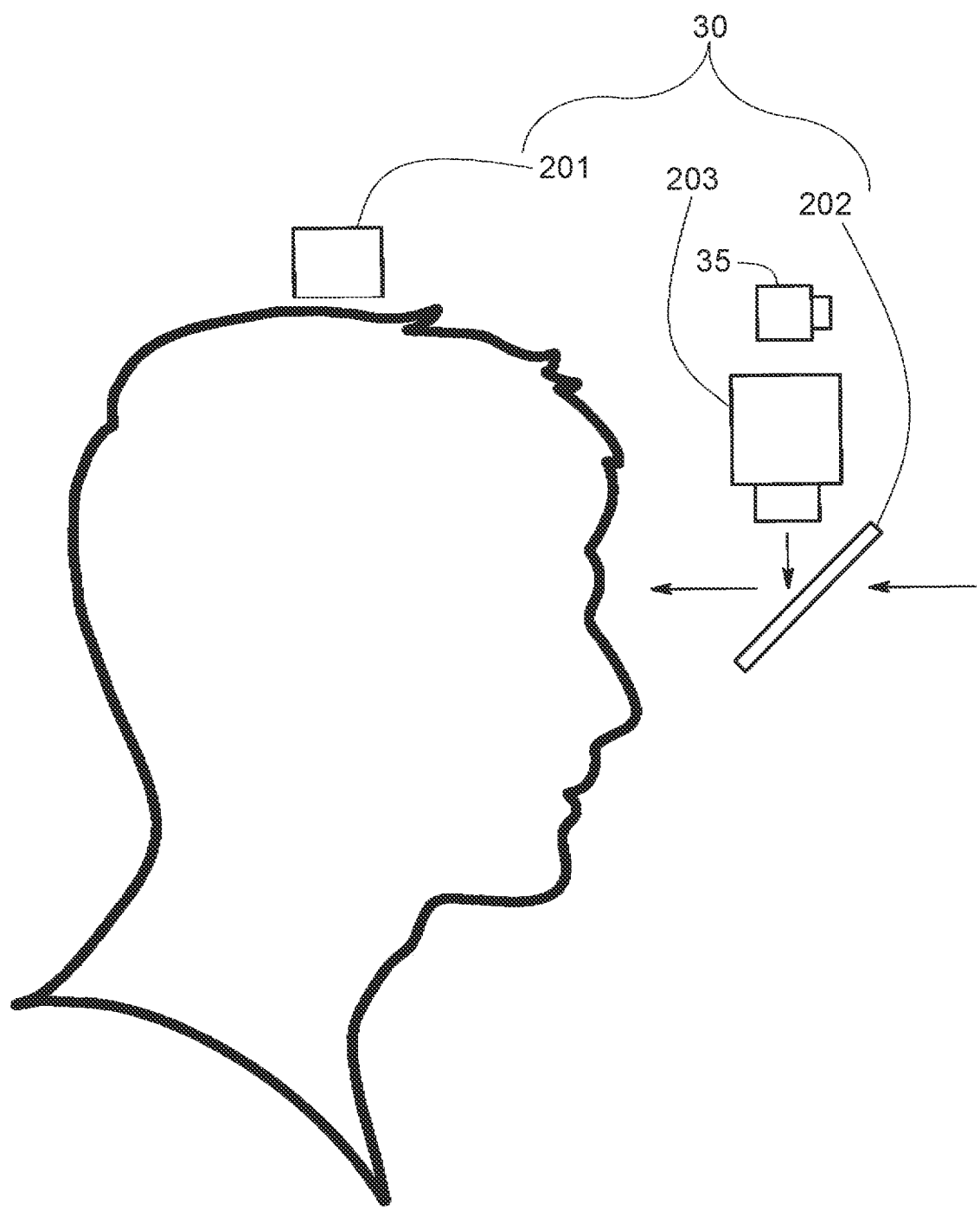
FIG. 20 is a diagram exemplifying a head-mounted display as another example of the display device according to the embodiment.

In the embodiment described above, the smartphone including the video see-through display is exemplified as the display device 30. The display device 30 according to this embodiment is not limited to this type of device. As exemplified in FIG. 20, the display device 30 may include an optical see-through display as in a head-mounted display (HMD).

In this case, the display device 30 includes the image shooting device 35, a half-silvered mirror 202 corresponding to the display unit 46, a projector 203 corresponding to the display controller 45 and the image recognizer 58, and a sensor unit 201 corresponding to the positional information acquirer 50.

For example, the half-silvered mirror 202 may be a lens of glasses or goggles. Light (image) from the real world is transmitted to a wearer through the half-silvered mirror 202. The projector 203 arranged above the half-silvered mirror 202 projects an image of a virtual object on the half-silvered mirror 202. Thus, an augmented reality image can be displayed by superimposing an image of a character that is a fleer virtual object on a scene in the entertainment complex 10 that is a scene in the real world.

What is claimed is:

1. A display system comprising:
   a display device including:
      an image shooting device configured to shoot a scene in a real world;
      an image recognizer configured to recognize real objects in an image shot by the image shooting device, and recognize positions of the recognized real objects on space coordinates; and
      a display controller configured to superimpose a virtual object at a designated position on the space coordinates in the shot image,
      the image recognizer being configured to recognize a gesture of the real object at the designated position of the virtual object in the shot image,
      the display controller being configured to execute image processing on the virtual object in response to the recognized gesture; and
   a manipulation device including an inputter configured to input a manipulation command to change the designated position of the virtual object, and
   a server communicable with the display device and the manipulation deivce,
   wherein:
      the display device is arranged in a complex facility including a plurality of facilities with different specific themes;
      the server includes:

a storage configured to store character images set as characters in the individual facilities in association with pieces of positional information in the complex facility, and a transmitter configured to transmit data on the character images to the display device together with the pieces of positional information associated with the character images; and the display controller is configured to select, as an image of the virtual object, the character image associated with the designated position, and superimpose the character image on the shot image.

2. The display system according to claim 1, wherein:

the gesture is a capturing action at the designated position;

the display device is configured to transmit a capture notification to the server when the image recognizer recognizes the capturing action performed by the real object; and the server includes a reward calculator configured to determine a reward for a manipulator of the manipulation device based on a fleeing period from a start timing of manipulation of the virtual object to a timing of recognition of the capturing action.

3. The display system according to claim 2, wherein;

the display device includes an inputter configured to input participation registration as a chaser in a chasing game for chasing the virtual object;

the manipulation device includes an inputter configured to input participation registration in the chasing game as a manipulator of the virtual object;

the server includes a participant calculator configured to calculate the numbers of the chasers and the manipulators participating in the chasing game, and acquire positions in the complex facility about the virtual object manipulated by the manipulator and the display device of the chaser; and the reward calculator is configured to determine the reward for the manipulator based on a virtual object space density around the captured virtual object at the timing of recognition of the capturing action.

4. The display system according to claim 3, wherein the reward calculator is configured to determine the reward for the manipulator of the manipulation device based on a chaser space density around the captured virtual object at the timing of recognition of the capturing action.

* * * * *